(12) United States Patent
Studor et al.

(10) Patent No.: US 11,272,806 B1
(45) Date of Patent: Mar. 15, 2022

(54) AUTOMATED BEVERAGE SYSTEM

(71) Applicant: Costa Express Ltd., High Wycombe (GB)

(72) Inventors: Charles F. Studor, Austin, TX (US);
Stephen A. Miller, Austin, TX (US);
Angelo Fancello, Austin, TX (US)

(73) Assignee: COSTA EXPRESS LTD., High Wycombe (GB)

( * ) Notice: Subject to any disclaimer, the term of this patent is extended or adjusted under 35 U.S.C. 154(b) by 817 days.

(21) Appl. No.: 15/897,941

(22) Filed: Feb. 15, 2018

Related U.S. Application Data

(60) Provisional application No. 62/459,064, filed on Feb. 15, 2017.

(51) Int. Cl.
*A47J 31/40* (2006.01)
*A47J 31/52* (2006.01)
*A47J 31/46* (2006.01)
*A47J 31/44* (2006.01)

(52) U.S. Cl.
CPC .......... *A47J 31/52* (2013.01); *A47J 31/402* (2013.01); *A47J 31/4403* (2013.01); *A47J 31/4496* (2013.01); *A47J 31/46* (2013.01); *A47J 31/525* (2018.08)

(58) Field of Classification Search
CPC ...... A47J 31/40; A47J 31/402; A47J 31/4482; A47J 31/4496; A47J 31/46; A47J 31/4475
See application file for complete search history.

(56) References Cited

U.S. PATENT DOCUMENTS

| | | | | |
|---|---|---|---|---|
| 9,808,114 B1* | 11/2017 | Heys | ................. | A47J 31/52 |
| 9,867,495 B2* | 1/2018 | Choi | ................. | A47J 31/057 |
| 2012/0183659 A1* | 7/2012 | Hulett | ................. | A47J 31/0631 |
| | | | | 426/431 |
| 2013/0125759 A1* | 5/2013 | Lin | ................. | A47J 31/44 |
| | | | | 99/281 |

FOREIGN PATENT DOCUMENTS

WO WO-2013039316 A2 * 3/2013 ............ A47J 31/46

* cited by examiner

*Primary Examiner* — Reginald Alexander
(74) *Attorney, Agent, or Firm* — Reising Ethington P.C.

(57) ABSTRACT

An automated beverage generating system is provided. The system comprises a dispensing mechanism from an ingredient for producing a specified beverage is dispensed, one or more electromechanical actuators operatively coupled to the dispensing mechanism and configured to effect movement of the dispensing mechanism in one or more directions, and a controller electrically connected to the one or more electromechanical actuators and configured to control the operation thereof. In response to receiving a request to produce a specified beverage, the controller is configured to control the operation of at least one of the one or more electromechanical actuators to cause the dispensing mechanism to move in at least one of the one or more directions.

11 Claims, 10 Drawing Sheets

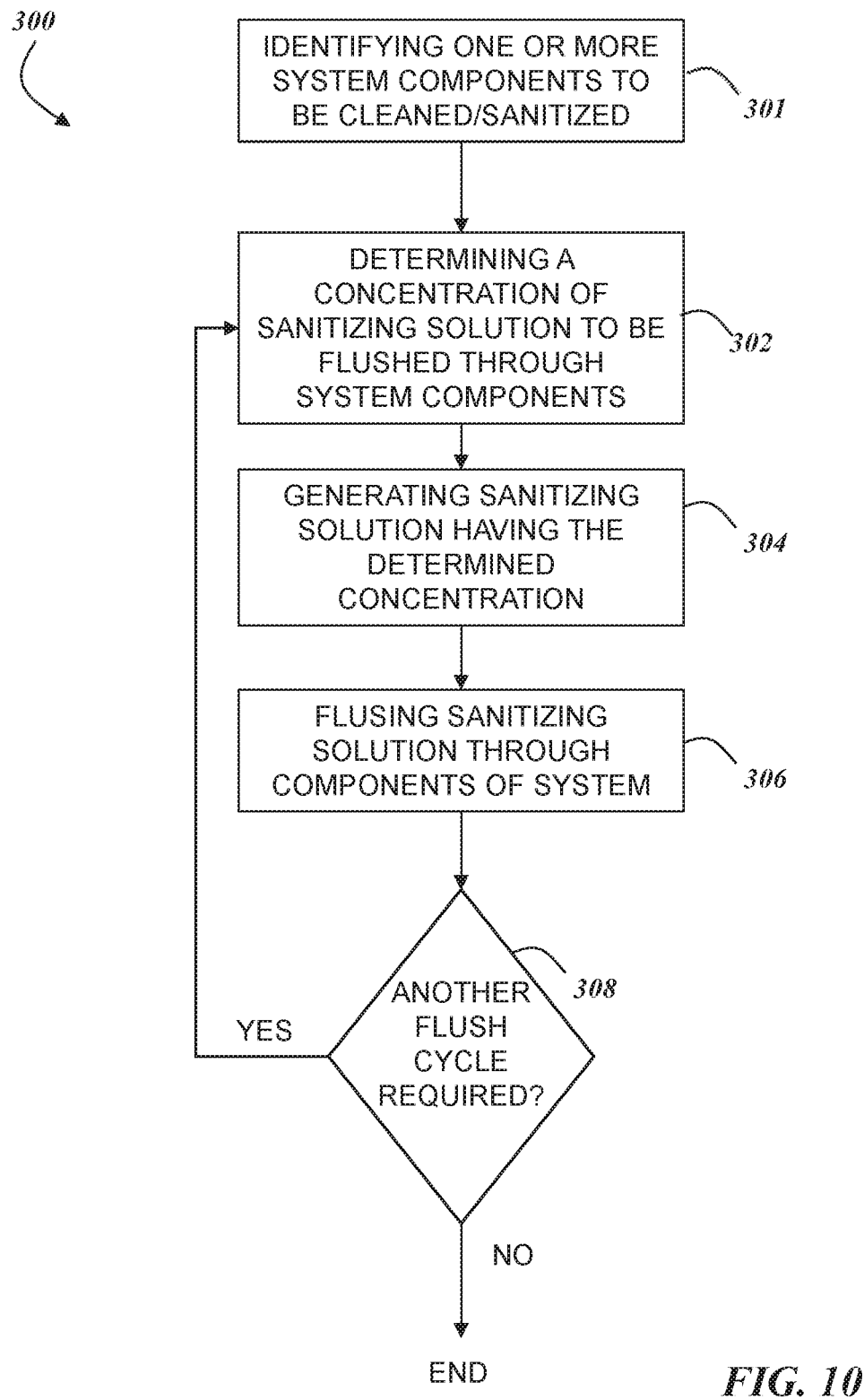

AUTOMATED BEVERAGE SYSTEM

CROSS REFERENCE TO RELATED APPLICATIONS

This application claims the benefit of U.S. Provisional Application Ser. No. 62/459,064 filed on Feb. 15, 2017, which is hereby incorporated by reference in its entirety.

TECHNICAL FIELD

This disclosure relates generally to systems and methods for generating and dispensing beverages, such as, for example, brewed beverages, and more particularly to automated systems and methods for scheduling, producing, and dispensing brewed beverages.

BACKGROUND

Known automated beverage systems (also known as automated beverage generating systems) may comprise any number of components to facilitate the ordering of a beverage, the generation or production of the ordered beverage, and ultimately the delivery or presentation of the generated beverage to a user (i.e., customer or another individual). Such systems may include or support, for example, one or more user input devices or interfaces to allow a user to select or order a desired beverage, one or more modules configured to contribute to the production or generation of the desired beverage, and one or more delivery mechanisms to deliver the completed beverage to the user.

Such automated beverage generating systems generally provide any number of benefits, for example, reducing (or eliminating) the number of personnel required to generate beverages as a compared to, for example, a retail coffee shop, and providing for the production of a wider range of beverages than, for example, beverages generated by conventional vending machines. However, such systems are not without their disadvantages or drawbacks. For example, meeting specific parameters or specifications of a customized ordered beverage, producing/generating high quality beverages, and the cleaning of certain components of the system either periodically or following the production or generation of each ordered beverage may prove difficult.

Accordingly, there is a need for an automated beverage generating system and method for operating the same that minimizes and/or eliminates one or more of the above-identified deficiencies.

SUMMARY

According to one embodiment, there is provided an automated beverage generating system. The system comprises a dispensing mechanism from which an ingredient for producing a specified beverage is dispensed, one or more electromechanical actuators operatively coupled to the dispensing mechanism and configured to effect movement of the dispensing mechanism in one or more directions, and a controller electrically connected to the one or more electromechanical actuators and configured to control the operation thereof. In response to receiving a request to produce a specified beverage, the controller is configured to control the operation of at least one of the one or more electromechanical actuators to cause the dispensing mechanism to move in at least one of the one or more directions.

According to another embodiment, there is provided a method of operating an automated beverage generating system. The method comprises receiving one or more electrical signals representative of an order for a specified beverage, and automatically effecting movement of a dispensing mechanism from which an ingredient for producing the specified beverage is to be dispensed to a predetermined position by controlling the operation of one or more electromechanical actuators operatively coupled to the dispensing mechanism.

According to another embodiment, there is provided a method of operating an automated beverage generating system. The method comprises receiving one or more electrical signals representative of an order for a specified beverage, determining the ingredients to be used in the generation of the specified beverage, and determining a timing parameter for the dispensing of a second ingredient relative to the dispensing of a first ingredient. The method further comprises automatically commencing the dispensing of the first ingredient, and then automatically commencing the dispensing of the second ingredient in accordance with the determined timing parameter.

According to still another embodiment, there is provided an automated beverage generating system. The system comprises an electronic processor having one or more electrical inputs and one or more electrical outputs, and an electronic memory device electrically coupled to the electronic processor and having instructions stored therein. The electronic processor is configured to access the memory device and execute the instructions stored therein such that the electronic processor is configured to: receive one or more electrical signals representative of an order for a specified beverage; determine the ingredients to be used in the generation of the specified beverage; determine a timing parameter for the dispensing of a second ingredient relative to the dispensing of a first ingredient; command the commencement of the dispensing of the first ingredient; and then command the commencement of the dispensing of the second ingredient in accordance with the determined timing parameter.

DESCRIPTION OF THE DRAWINGS

Preferred illustrative embodiments will hereinafter be described in conjunction with the appended drawings, wherein like designations denote like elements, and wherein:

FIG. 10 is a flow diagram depicting various steps of an illustrative embodiment of a method for cleaning/sanitizing one or more components of an automated beverage generating system, for example, the beverage generating system illustrated in FIG. 1

DETAILED DESCRIPTION OF EMBODIMENTS

The methods and systems described herein may be used to produce and dispense beverages, such as, for example and without limitation, brewed beverages (e.g., hot or cold brewed beverages). For purposes of this disclosure, the phrase "brewed beverages" or "brewed beverage" is intended to mean any consumable beverage that is made through a process in which a liquid and one or more ingredients are combined though one or more of mixing, stirring, boiling, steeping, infusion, frothing, pressurization, and/or fermentation over a prescribed period of time. Examples of brewed beverages include, but are not limited to, coffee, tea, espresso, and beer. It will be appreciated that while the description below is primarily with respect to the production of brewed beverages, the present disclosure is not meant to be so limited. Rather, the methods and systems described herein may also be used to produce other types of prepared beverages, such as, for example, hot chocolate and energy drinks, to name a few. In any event, the system may be implemented as a single, fully-automated kiosk that, in an illustrative embodiment, is configured to communicate with a central host; or as a network of kiosks, each of which is configured to communicate with a central host and one or more other kiosks.

For purposes of this disclosure, a fully-automated kiosk is intended to mean a kiosk wherein one or more tasks for generating a beverage are automated or performed automatically (i.e., without human involvement). This may include all of the tasks for generating a beverage and presenting the generated beverage to a user, or may alternatively include some but less than all of the tasks required for generating and presenting the beverage. In any event, the system may reduce the fixed overhead associated with serving high quality beverages, as well as the capital required to create a point-of-sale (POS) kiosk unit. The systems and methods described herein may create a quality beverage that, in at least some embodiments, meets with customer/user-defined specifications, while eliminating (or at least reducing) the need for personnel, such as, for example, expert baristas, and may maximize the intervals between required service by a technician. The systems and methods described herein include automated beverage generation apparatus that is/are able to automatically perform one or more of the beverage generation steps/tasks for a given beverage even if human intervention is required to facilitate other steps/tasks of the beverage generation process (e.g., moving a cup/container in which at least a portion of the beverage is being generated, placing a label on a cup, etc.). Additionally, a kiosk is not intended to be limited to any particular size, location, or number of tasks/steps of a beverage generation process.

Figure 1:
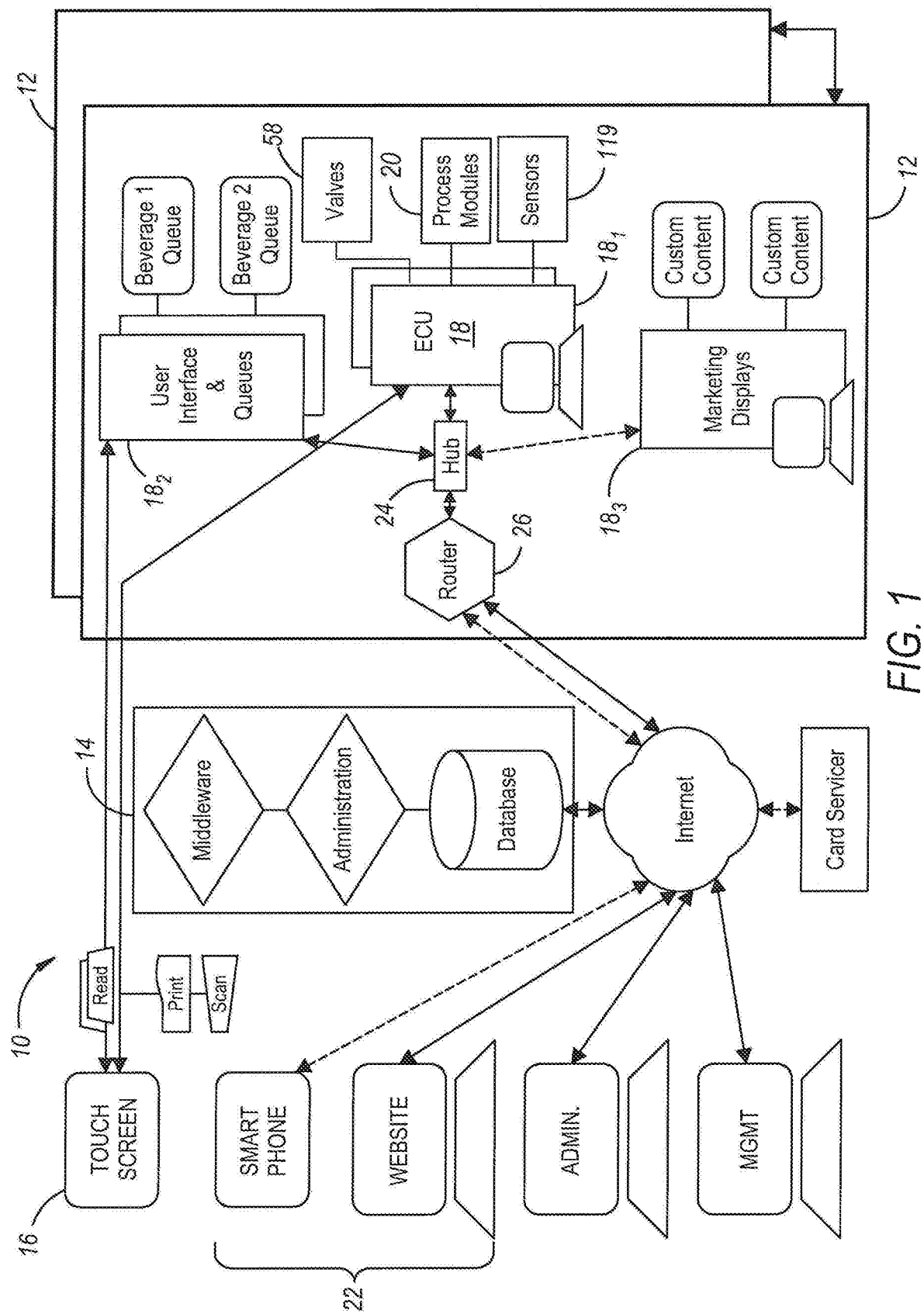
FIG. 1 is a schematic and diagrammatic view of an illustrative embodiment of an automated beverage generating system.

Referring now to the drawings wherein like reference numerals are used to identify identical or similar components in the various views, FIG. 1 illustrates an illustrative embodiment of a system 10 for, among other things, preparing and dispensing beverages, such as, for example, brewed beverages (e.g., coffee, espresso, tea, etc.). In an illustrative embodiment, the system 10 comprises a kiosk 12 (e.g., a standalone or walkup kiosk) and a central host or datacenter 14 configured to communicate with the kiosk 12. In another illustrative embodiment, the system 10 may comprise a plurality of kiosks 12, each of which is configured to prepare and dispense beverages and to communicate with the central host 14 and one or more other kiosks 12. In yet another embodiment, the central host 14 may be part of one of the kiosks 12. In yet still another embodiment, there may be two or more hosts 14 that can control the kiosk(s) 12 for the purpose of, for example, redundancy or speed of operation.

As described in U.S. Pat. No. 8,515,574 issued on Aug. 20, 2013, U.S. Patent Publication No. 2013/0087050 published on Apr. 11, 2013, and U.S. Patent Publication No. 2014/0277703 published on Sep. 18, 2014, the entire contents of each of which are hereby incorporated by reference, in an illustrative embodiment, the kiosk 12 comprises a plurality of components that may allow for a fully automated kiosk having the functionality to, in general terms, take ground coffee or beans as an input and to produce a fully lidded brewed beverage as an output. To that end, the kiosk 12 may optionally include, among other components, one or more user interface mechanisms 16 that are connected via wired or wireless connections, an electronic control unit (ECU 18), and one or more process modules 20. In various embodiments, the kiosk 12 may further comprise a cup handler, a lid dispenser, a completed drink presenter, a presentation area, and various actuators, valves, sensors, and/or other components, some of which are described below.

As shown in the example illustrated in FIG. 1, the kiosk 12 may include one or more user interfaces 16. A user interface may include any number of devices suitable to display or provide information to a user (e.g., customer, potential customer, administrator, service technician, etc.) and/or to receive information from a user. Accordingly, the user interface(s) 16 may comprise, for example, one or more of: a liquid crystal display (LCD); a touch screen LCD (e.g., a 15-inch touch screen LCD); a cathode ray tube (CRT); a plasma display; a keypad; a keyboard; a computer mouse or roller ball; a joystick; one or more switches or buttons; a graphical user interface (GUI); a text-based interface; or any other display or monitor device. The user interface(s) 16 may further include one or more of: a card reader (e.g., for credit, debit, loyalty, gift, and other like cards); a radio frequency identification (RFID) reader; a coin acceptor; a printer; a loyalty or gift card dispenser; a microphone; and/or a speaker. In an illustrative embodiment, one or more of the user interfaces 16 are disposed at the same location as the kiosk and may be disposed either within the outer housing thereof, or in close proximity thereto, such that it may be accessed by customers and communicates with the kiosk (ECU 18) or central host 14 via wired or wireless connections as described in more detail below. Accordingly, and as will be described more fully below, the user interface(s) 16 provide(s) an interface between the kiosk 12 and a user and may be configured to permit either one-way or two-way communication therebetween.

In an illustrative embodiment, in addition to, or instead of, the kiosk 12 including one or more user interfaces 16, the system 10 may include one or more user interfaces 22 that are separate and distinct from the kiosk 12, but that provide a direct or indirect interface between a user and one or more kiosks 12 of the system 10. As with user interface(s) 16 of the kiosk 12, the user interface(s) 22 may be configured to permit either one-way or two-way communication between a user and one or more kiosks 12. For example, and as will be described in greater detail below, one or more components of the system 10 (e.g., the ECU 18 of the kiosk 12, the central host 14, etc.) or some other component (e.g., a software application or "app") may be configured to generate a user interface 22 in the form of a graphical or text-based interface (e.g., having one or more user-selectable or user-inputtable fields or links) that may be displayed, as illustrated in FIG. 1, on a suitable device (e.g., smart phone, tablet, computer, PDA, etc.) and allow a user to interact or communicate directly with the kiosk 12, or indirectly through, for example, the central host 14. It will be appreciated that in an embodiment wherein the graphical or text-based user interface is communicated to a suitable user device, such communication may be supported or facilitated by any number of well-known communication techniques and protocols, such as, for example, one or more of those described below.

As was briefly described above, in an illustrative embodiment, one or more user interfaces 16 of the kiosk 12 and/or one or more user interfaces 22 of the system 10 may be configured to allow for one-way communication from the kiosk 12 or the system 10 to a user. More particularly, the user interface(s) 16, 22 may be configured to allow for the display of messages or other graphics that pertain or may be of interest to a particular user (e.g., customer-specific messages or content), or general messages/information not directed to any one person in particular. In such an embodiment, that or those user interface(s) 16, 22 may not allow for interaction on the part of the user (e.g., to respond to inquiries, place orders through the user interface, etc.). Rather, the user interface(s) 16, 22 is/are configured strictly for the display of information or other content.

Conversely, in other embodiments, one or more user interface(s) 16, 22, may be configured to facilitate two-way communication between the kiosk 12 or the system 10 and a user. More particularly, the one or more user interface(s) 16, 22 may comprise an interactive interface that allows a user to interact with, for example, the kiosk 12 and/or the central host 14. For instance, one or more of user interfaces 16, 22 may be configured to display a message prompting a user to input certain information (e.g., the selection of a function, operation, or customization to be performed; the selection of a beverage to be produced; user identifying information; etc.), and to also provide a means by which such information may be inputted (e.g., user-selectable or user-inputtable fields or links). The input provided by the user may then be communicated to, for example, a component of the kiosk 12 (e.g., the ECU 18) or to the central host 14, which may then take certain action in response to the received input. In an illustrative embodiment, the communication between the user interface(s) 16, 22 and an intended recipient may be direct communication (i.e., electrical signals flow from the user interface directly to the intended recipient (e.g., a component of kiosk 12, central host 14, etc.)). In other illustrative embodiments, however, the communication may be indirect such that the input received at the user interface may be routed and relayed from the user interface, to one or more other components of the kiosk 12 or the system 10, and then to the intended recipient. For example, an input received at a user interface may be routed from the user interface to the central host 14, which may then relay the input to the kiosk 12. Similarly, in another example, the input received at a user interface may be communicated from the user interface to a controller or ECU associated therewith, which may then relay the input to an intended recipient such as, for example, the ECU 18 of the kiosk 12 or the central host 14. In yet another example, the input received at a user interface may be routed through, for example, one or more intermediary components of the kiosk 12, such as, for example, a hub (e.g., hub 24 in FIG. 1), a router (e.g., router 26 in FIG. 1), a modem, etc., prior to the input reaching the intended recipient. Accordingly, it will be appreciated that a user input received at a user interface may be communicated to the intended recipient(s) in any number of ways, each of which remains within the spirit and scope of the present disclosure. It will be further appreciated that the communication described above may be supported or facilitated by any number of well-known communication techniques and protocols, such as, for example, one or more of those described below.

Accordingly, in view of the above, it will be appreciated that user interface(s) 16, 22 may be configured to serve a number of purposes and to perform a number of functions, all of which remain within the spirit and scope of the present disclosure. It will be further appreciated by those of ordinary skill in the art that the user interface(s) 16 and the user interface(s) 22 may be configured to perform some or all of the same functionality. Accordingly, while certain functionality may have been described herein as being performed only by or through the user interface(s) 16 or the user interface(s) 22, the present disclosure is not intended to be so limited, but rather in various embodiments, and as appropriate, some or all of the functionality may be performed by either the user interface(s) 16 or the user interface(s) 22.

Figure 3:
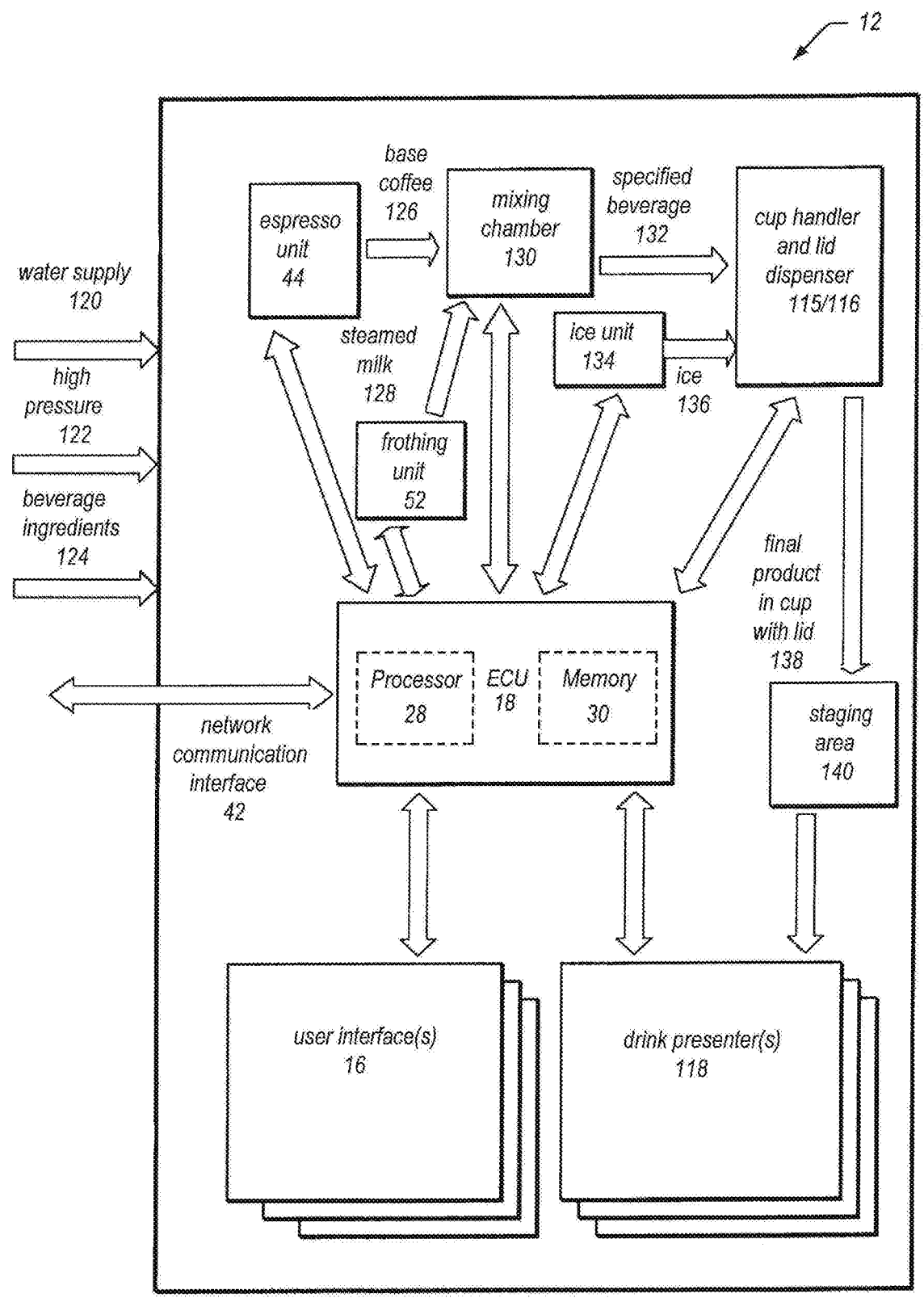
FIG. 3 is a diagrammatic view of an illustrative embodiment of the kiosk illustrated in FIG. 2 that is configured to produce an espresso-based beverage.

In the embodiment illustrated in FIG. 1, the ECU 18 of the kiosk 12 is disposed within an outer housing or enclosure of the kiosk 12. In other embodiments, the ECU 18 may be alternatively disposed outside of such an enclosure but in close proximity thereto. As shown in FIG. 3, in an embodiment, the ECU 18 comprises one or more electronic processors 28 and one or more electronic memory devices 30 each of which may be part of (i.e., onboard) a processor or at least accessible thereby. In other embodiments, rather than or in addition to the ECU 18 comprising a memory device, the kiosk 12 may include one or more memory devices that are separate and distinct from the ECU 18 but that are nonetheless accessible thereby.

The processor(s) 28 of the ECU 18 may include any type of suitable processor (e.g., a programmable microprocessor, a single-core processor, a multi-core processor, a multi-thread processor, a microcontroller, an application specific integrated circuit (ASIC), etc.) that is configured to execute appropriate programming instructions for software, firmware, programs, algorithms, scripts, etc., to perform various functions, such as, for example and without limitation, those described herein (e.g., one or more of the method described below).

The memory device(s) 30, whether part of the ECU 18 or separate and distinct therefrom, may include any type of suitable electronic memory means known in the art (e.g., one or more of those described elsewhere herein) and may store a variety of data and information. This includes, for example: software, firmware, programs, algorithms, scripts, and other electronic instructions that, for example, are required to perform or cause to be performed one or more of the functions described elsewhere herein (e.g., that are used by ECU 18 to perform various functions described herein); customer-specific data and information; various data structures; operating parameters and characteristics of the kiosk and the components thereof; information relating to ingredients used in or by the kiosk; beverage recipes; beverage production queues; etc. Alternatively, rather than all of the aforementioned information/data being stored in a single memory device, in an embodiment, multiple suitable memory devices may be provided.

In any event, the aforementioned instructions may be provided as a computer program product, or software, that may include a non-transitory, computer-readable storage medium. This storage medium may have instructions stored thereon, which may be used to program a computer system (or other electronic device, for example, the ECU 18) to implement or control some or all of the functionality described herein, including one or more steps of the methods described herein. A computer-readable storage medium may include any mechanism for storing information in a form (e.g., software, processing application) readable by a machine (e.g., a computer, processing unit, etc.). The computer-readable storage medium may include, but is not limited to: magnetic storage medium (e.g., floppy diskette); optical storage medium (CD-ROM); magneto optical storage medium; read only memory (ROM); random access memory (RAM); erasable programmable memory (e.g., EPROM and EEPROM); flash memory; or other types of medium suitable for storing program instructions.

As will be described below, the ECU 18 may be electronically connected to other components of the kiosk 12 via I/O devices and suitable connections, such as, for example, a communications bus or a wireless link or optical link, so that they may interact as required. It will be appreciated, however, that the present disclosure is not meant to be limited to any one type of electronic connection, but rather any connection that permits communication between the ECU 18 and other components of the kiosk 12 may be utilized.

The ECU 18 may be configured to perform, or cause to be performed, some or all of the functionality of the kiosk 12, including, for example, some or all of those functions and features described herein. For example, and with reference to the illustrated embodiment depicted in FIG. 2, the ECU 18 may coordinate all user interfaces 16, machine controls, valves, sensors, and feedback (e.g., control and feedback illustrated at 32, 34, 36, 38, and 40 in FIG. 2), as well as communication to the central host 14 and/or one or more other components or devices of the system 10 (e.g., other kiosks 12 in system 10), if applicable. For example, all valves, heaters, pumps, servo motors, actuators, flow control mechanisms, and/or other mechanical components of process modules 20 and/or the kiosk 12 as a whole described below may be controlled by the ECU 18. Accordingly, in an illustrative embodiment, the ECU 18 may be configured to receive a request for the production of a beverage from a user interface 16 of the kiosk 12 (or from either a user interface 22 of the system 10 or the central host 14), and to then effect the production of the specified beverage by controlling (directly or indirectly) the operation of the process modules 20 and other components (e.g., valves, actuators, etc.) required to produce the specified beverage. In an illustrative embodiment, the ECU 18 may be further configured to exert at least a measure of control over one or more user interfaces 16 (and/or user interfaces 22, in certain embodiments) to cause, for example, messages to be displayed thereon notifying a customer, among possibly other things, that the production of the beverage they requested has been completed and that it is ready to be picked-up.

In addition, the ECU 18 may also be configured to interact with the central host 14 for any number of purposes. More particularly, in an illustrative embodiment, the ECU 18 provides a gateway through which the central host 14 may monitor or observe the status of any or all components of the kiosk 12, and/or to exert control over one or more components of the kiosk 12. For example, in addition to controlling one or more servos, actuators, valves, process modules, various sensors, and/or other components of the kiosk 12, the ECU 18 may also be configured to receive and analyze data collected by components of the kiosk 12 (e.g., sensors) to determine, for example, the state of the kiosk 12 or one or more of its constituent components, information relating operational and/or environmental parameters, raw material volumes on hand, age and types of raw materials, current activity, etc. Additionally, the ECU 18 may be further configured to create and manage a beverage production queue for the kiosk 12 and to share that queue with the central host 14. The data/information may be periodically (or on demand) uploaded by the ECU 18 to a local memory device of the kiosk 12 that is part of or accessible by the ECU 18, and/or to the central host 14. The central host 14 may then present the data/information from the kiosk (as well as data/information from other kiosks, in certain embodiments) to, for example, users of the system 10 (e.g., customers, administrators, etc.), and/or store it a database thereof. Additionally, in an illustrative embodiment, the ECU 18 may be configured to determine that certain operational or environmental conditions exist, and to then provide one or more alerts to the central host 14 and/or another kiosk 12 indicating the existence of such condition(s). The ECU 18 may also be further configured to receive instructions from the central host 14 to perform or cause to be performed certain functionality, and to then carry out those instructions.

Figure 2:
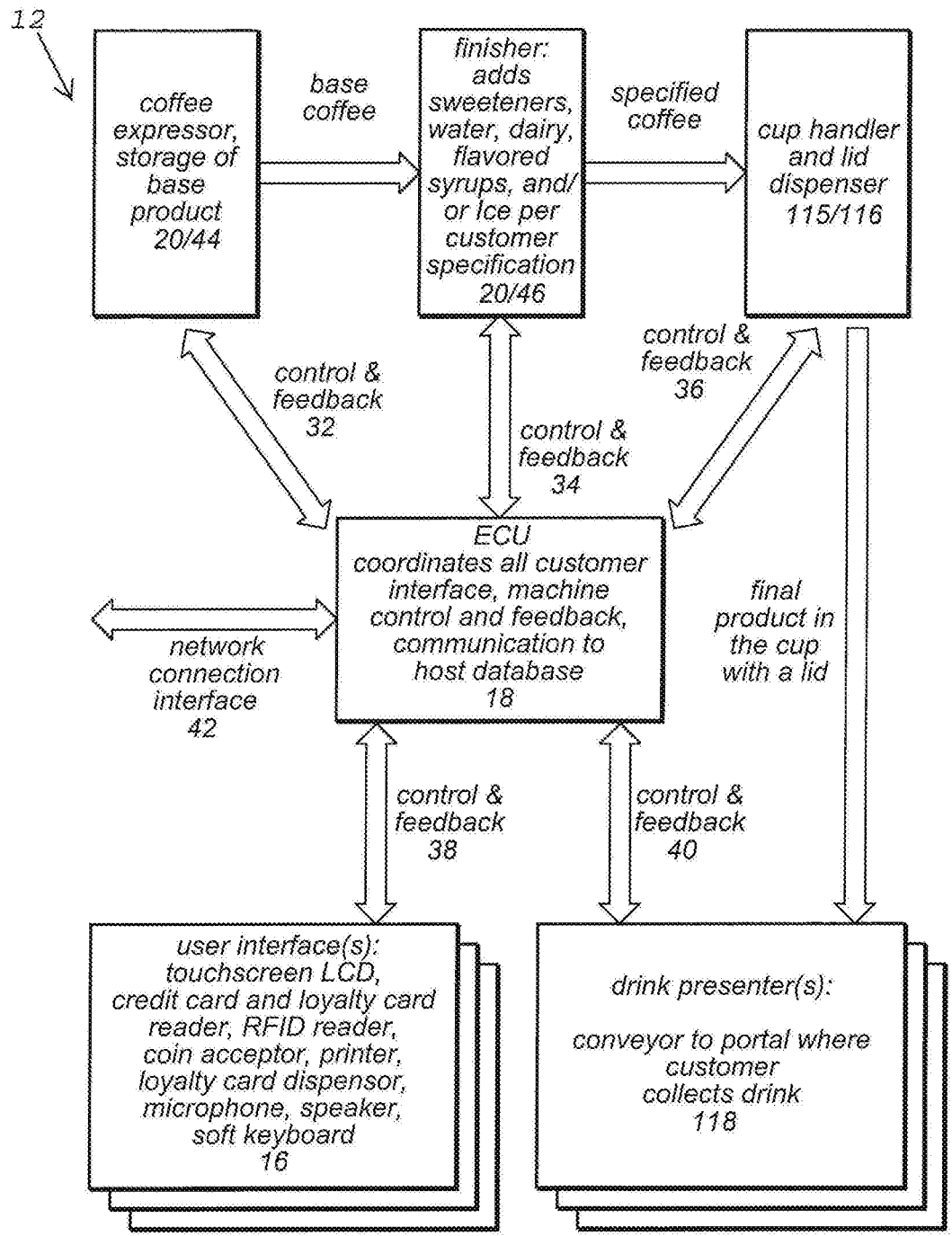
FIG. 2 is a diagrammatic view of an illustrative embodiment of a beverage-producing kiosk of an automated beverage generating system, for example, the system illustrated in FIG. 1.

To facilitate the interaction and communication between the ECU 18 and other components of the system 10 such as the central host 14, the ECU 18 may comprise, as shown in FIG. 2, one or more network or communication interfaces 42 that may include or be electronically connected to, and configured for communication with, other infrastructure of the kiosk 12 (e.g., known components/devices such as, for example, routers, modems, antennas, electrical ports, transceivers, etc.) configured to facilitate and support one or more types of communication networks or techniques/protocols, such as, for example, those described elsewhere below. In any event, the network interface 42 allows for the exchange of data/information between the ECU 18 and one or more other components of the system 10.

It will be appreciated by those having ordinary skill in the art that while the ECU 18 is illustrated in FIG. 2 as a single component, in some embodiments, the functionality of the ECU 18 described herein may be performed or caused to be performed by more than one ECU or other like component. For example, in an illustrative embodiment, the kiosk 12 may comprise a plurality of ECUs, each one of which is configured to perform or cause to be performed (e.g., command) different functionality. For example, and as illustrated in FIG. 1, a first ECU (i.e., ECU 181) may be configured to control the process module(s) 20 (i.e., to form a beverage production subsystem, for example), while a second ECU (i.e., ECU 182) may be configured to control the user interface(s) 16 (i.e., to form a user interface subsystem, for example), and a third ECU (i.e., ECU 183) may be configured to control various marketing and/or other administrative functions (i.e., to form a marketing/administrative subsystem, for example). In such an embodiment, the various ECUs may be electronically connected to each other to allow for communication therebetween, and each may be configured to also communicate with other components of the system 10, such as, for example, the central host 14, through a dedicated network interfaces or other components thereof, or common network interface(s) of the kiosk 12. In another illustrative embodiment, the kiosk 12 may include a number of ECUs configured to control different functionality of the kiosk 12, but also includes a "master" ECU that is configured to manage and control the operation of the individual dedicated ECUs so as to have a coordinated, multi-tiered control scheme for the kiosk 12. In such an embodiment, the master ECU may be the sole ECU that is configured to interface with other components of the system 10, or alternatively, the individual dedicated ECUs may also be configured to interface with one or more other components of the system 10 directly.

While it will be apparent in view of the foregoing that any number of suitable control schemes or arrangements employing one or multiple ECUs or other suitable control/processing devices may be used to carry out the functionality of the kiosk 12 and the various components thereof, in particular, for purposes of illustration and clarity, the description below will be primarily with respect to an illustrative embodiment wherein the kiosk 12 includes a single ECU (i.e., the ECU 18) for controlling most, if not all, of the functionality of the kiosk 12 and the components thereof. It will be appreciated by those having ordinary skill in the art, however, that the present disclosure is not meant to be limited to such an embodiment, but rather, in view of the above, any number of suitable control schemes and arrangements may be used and such other schemes and arrangements remain within the spirit and scope of the present disclosure.

As briefly described above, the kiosk 12 may further comprise one or more process modules 20. Each process module 20 is configured to perform one or more chemical or mechanical processes required for producing one or more beverages or types of beverages. In an embodiment, each process module 20 is configured to perform one or more different mechanical and/or chemical processes than that or those performed by the other process modules. Alternatively, two or more process modules 20 may be configured to perform the same mechanical and or chemical process(es) so as to add a measure of redundancy and flexibility to the kiosk 12 in case one such process module fails or is otherwise inoperable, or there is a high demand for the process(es) performed by those process modules 20.

The process modules 20 may take any number of forms. For example, and as illustrated in FIG. 2, one type of process module is an expressor unit 44 that is configured, for example, to brew coffee. Another type of process module is a finisher unit 46 that is configured, for example, to dispense one or more additives required for various beverages (e.g., flavored syrup, milk (dairy and/or non-dairy), ice, sweeteners, water, etc.). Accordingly, in an embodiment, kiosk 12 includes an array of process modules 20 that are configured to perform a variety of beverage production-related processes. Additionally, while certain examples of process modules were provided above, it will be appreciated that kiosk 12 may include process modules in addition to or in lieu of those described above as the present disclosure is not intended to be limited to any particular type(s) of process modules.

In any event, each process module 20 may comprise one or more components or devices for performing the chemical and/or mechanical processes that the process module 20 is configured to perform. For instance, an expressor unit may comprise a number of components or devices, such as, for example, a grinder unit (configured to grind coffee beans), a tamper unit (configured to form the coffee grounds from the grinder unit into a "puck") and a brew tube (configured to brew coffee using the puck created by the tamper unit). Accordingly, in an embodiment, one or more process modules 20 may include a combination of components or devices, each of which is configured to perform a different function. Alternatively, one or more process modules 20 may be configured to perform only one process, and therefore, may comprise a single component or device (e.g., only one of a grinder unit, tamper unit, brew tube, etc.). Accordingly, embodiments wherein a given process module 20 is configured to perform a single process or multiple processes remain within the spirit and scope of the present disclosure.

In an embodiment, the operation of each process module 20 is controlled by the ECU 18. In such an embodiment, each process module 20 is electronically connected to and configured for communication with the ECU 18. It will be appreciated as described above, however, that in other embodiments, one or more process modules 20, or one or more constituent components thereof, may be alternatively controlled by dedicated ECUs that may be part of that process module or component but that is under the control of the ECU 18, or by other ECUs of the kiosk 12 or the system 10, such as, for example, by the central host 14.

In addition to the kiosk 12 including one or more process modules, in an embodiment, the kiosk 12 may include one or more beverage production or generation stations (e.g., super-automatic machines) at which one or more (and, in certain embodiments, all or at least two or more) of the processes or tasks required for generating a particular beverage may be performed (e.g., two or more ingredients for generating or producing a beverage may be dispensed at a given station without having to have move the cup/container into which the ingredients are dispensed).

Figure 4:
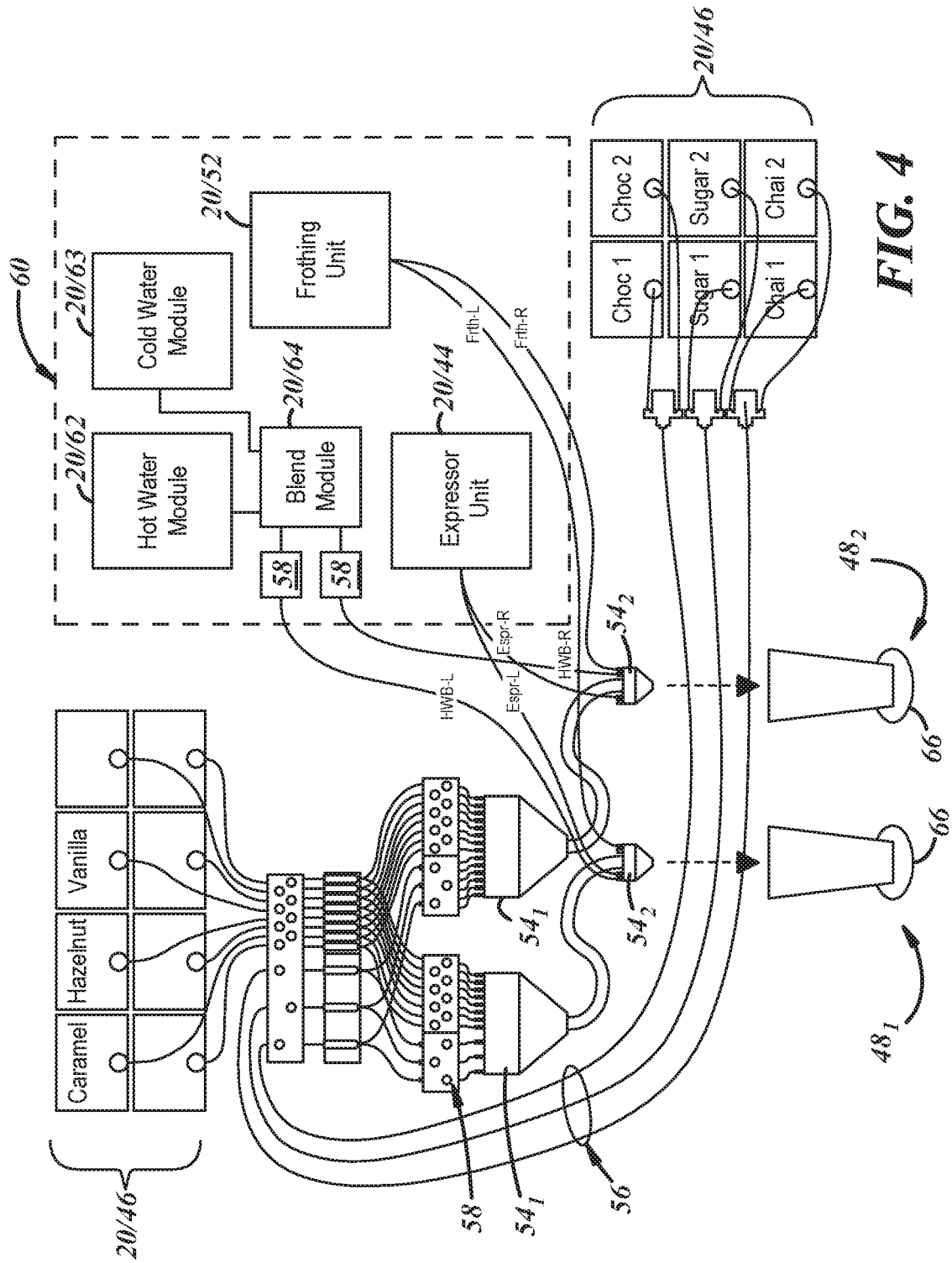
FIG. 4 is a diagrammatic and schematic view of an illustrative embodiment of a beverage generating station of a beverage-producing kiosk, for example, the kiosk illustrated in FIG. 2.

FIG. 4 depicts an illustrative embodiment of beverage production stations 48. In an embodiment, each station 48 may be controlled by the ECU 18 of the kiosk 12. Alternatively, each station 48 may include a dedicated ECU or share an ECU with another station 48. In either instance, the ECU may be electrically connected to and configured for communication with the ECU 18 of the kiosk 12. In an embodiment, this electrical connection may be through one or more interconnects of the kiosk 12 (e.g., communication bus(es)), while in other embodiments, other wired or wireless connections may be utilized. The ECU may have a similar construction and operation as that described above with respect to the ECU 18, and thus, that description is incorporated here by reference. For a given station having an ECU, the ECU may be configured to receive instructions or commands from the ECU 18 and to then control one or more components of the station 48 to carry out that/those commands. Whether or not a particular station has an ECU or rather is controlled directly by the ECU 18, the stations 48 may take a number of forms and/or have a number of different constructions.

For example, the kiosk may include one or more stations that are each comprised of two or more sub-modules which may, in turn, comprise two or more process modules 20. By way of illustration, a station may include one or more expressor units 44, one or more finisher units 46, and one or more frothing units 52. Accordingly, when a cup or container is located at such a station (i.e., at a dispensing location of the station), ingredients dispensed by those process modules may be dispensed into the cup/container and/or other tasks performed by those process modules may be performed without having to move the cup/container to another location.

The kiosk may additionally or alternatively include one or more stations comprised of one or more process modules 20 and one or more apparatus or mechanisms (e.g., tubes) that couple the output(s) of one or more process modules 20 or other components of the kiosk 12 that are located apart from the station (e.g., process module(s) of other stations 48) to the station. For example, the station may include a frothing unit and a tube coupled via a valve to the output of an expressor unit that is part of a different station or not part of any particular station. Accordingly, when a cup or container is located at such a station, ingredients dispensed by expressor unit remote from the station may be dispensed into the cup/container and tasks performed by the process modules of the station (e.g., frothing) may be performed without having to move the cup/container to another location.

The kiosk may additionally or alternatively include one or more stations that do not actually comprise any process modules, but rather include one or more apparatus or mechanisms that couple the output(s) of one or more process modules 20 or other components of the kiosk 12 located remotely from the station to the station. For example, FIG. 4 depicts two stations 481 and 482. Neither of these stations actually includes a process module, but rather both stations include mechanisms, for example, dispensing mechanisms (e.g., funnels or nozzles) 541, 542, fluid pathways 56 (e.g., tubes), etc.) that couple the station (e.g., nozzles 54) to various process modules 20 and/or other components of the kiosk 12. More particularly, in this particular embodiment, the stations 481, 482 are both fluidly coupled via, for example, fluid pathways 56 and/or various valves 58 to a multi-process module 60 (e.g., super-automatic machine) that comprises a plurality of process modules 20 (e.g., an expressor unit 44, a frothing unit 52, a hot water module 62, a cold water module 63, and blend module 64, etc.), and one or more other process modules 20 (e.g., one or more finisher units 46 for dispensing additives). One or more flowmeters or other sensors (not shown) may also be provided to measure the flow of ingredients from various components of the multi-process module 60 and/or the process modules 20/46. Accordingly, when a cup or container is located at such a station, ingredients dispensed by the process modules and/or other kiosk components may all be dispensed into the cup/container without having to move the cup/container to another location, e.g., the location of that or those process modules/components.

An arrangement wherein a station includes mechanisms fluidly coupled to output(s) of one or more components or modules located elsewhere may serve a number of purposes. For one, the arrangement may provide redundancy such that if a process module of the station is inoperable, but the station also includes an output of that same type of process module that is located elsewhere, the ingredient supplied by that module can still be dispensed/supplied by routing the ingredient to the station at which the cup/container is located. As a result, the beverage can still be produced and can be done without having to move the container/cup within the kiosk 12. Another purpose that may be served by this arrangement is that it allows for the sharing of resources amongst stations 48. More specifically, instead of including a particular component or process module (e.g., finisher unit, expressor unit, etc.) in each station, two or more stations may share a single component or module with one or more of those stations including an apparatus (e.g., tube, valve, etc.) that couples the output of the component/module to the station(s).

Similar to the above, the kiosk may additionally or alternatively comprise a plurality of apparatus or mechanisms (e.g., tubes) that couple the outputs of two or more process modules 20 or other components of the kiosk 12 that are not part of the station but rather are located elsewhere (e.g., process module(s) of other stations). For example, in an embodiment, a given station may include an apparatus (e.g., tube) coupled via a valve to the output of an expressor unit of a different station or that is not part of any particular station, and a tube coupled via a valve to the output of a finisher unit of a different station or that is not part of any particular station. As with the embodiment described above, such an arrangement allows for the sharing of resources amongst stations.

In addition to the above, a station may also include one or more cup/container support structures configured to support a cup/container into which one or more ingredients are to be dispensed at the station (e.g., load cells, cup holders, etc.). For example, in the embodiment illustrated in FIG. 4, each station 48 includes one cup support structure 66 on or in which a container may be placed or held during the dispensing of ingredients therein from the dispensing mechanism 542. In another embodiment, rather than the container support structure being part of the station, it may be carried by for example, an arm (e.g., robotic arm or arm of an XYZ actuator), or conveyor of the kiosk 12 that is configured to be moved to a dispensing location of the station.

In view of the foregoing, it will be appreciated that any number of arrangements may be used for a beverage production station of the kiosk 12, and thus, the present disclosure is not intended to be limited to any particular arrangement(s). For example, a single station may include two or more dispensing locations (e.g., container support structures) where additional containers can be placed and serviced by the various modules in accordance with the description above.

Figure 6:
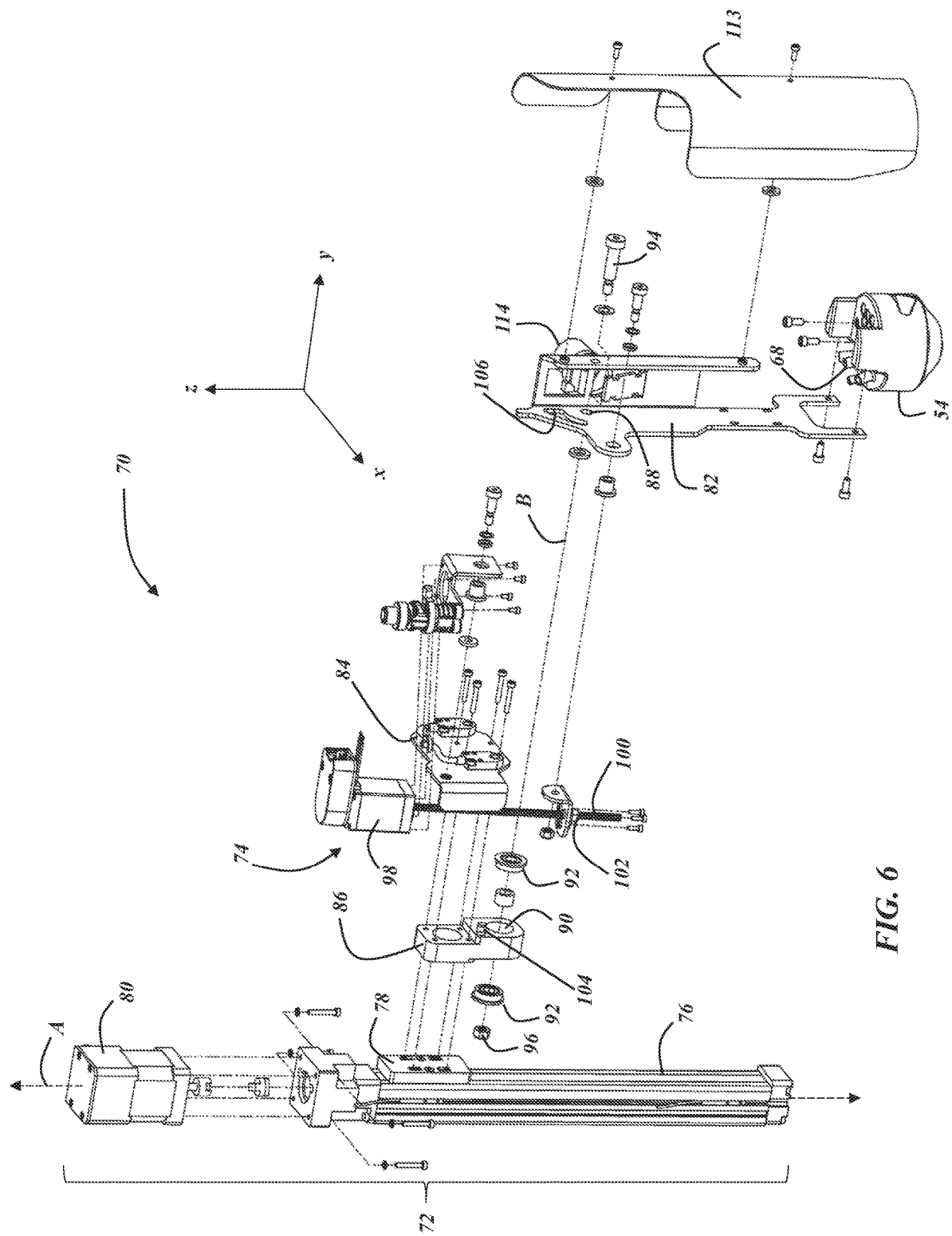
FIG. 6 is an exploded view of the dispensing mechanism assembly illustrated in FIG. 5.

As described above, the kiosk 12 includes one or more dispensing mechanisms or nozzles 54 from which ingredients may be dispensed in the generation of beverages. In an embodiment such as that described above wherein the kiosk 12 includes one or more beverage production stations 48, each station 48 may include one or more nozzles 54. In other embodiments, each process module 20 that is configured to dispense one or more types of ingredients used in the generation of beverages may include a nozzle 54 fluidly coupled to the process module 20 via, for example, one or more tubes or conduits. In other embodiments, multiple process modules 20 may share one or more nozzles 54. In an embodiment wherein the kiosk 12 includes a nozzle from which multiple ingredients may be dispensed, the nozzle may include a series of ports to which tubes connected to different ingredient sources may be respectively coupled (see, for example, FIG. 6 showing a nozzle 54 with a series of ports 68).

In at least some embodiments, the kiosk 12 includes at least one nozzle 54 that is configured for movement in one or more dimensions. For example, in an embodiment, the nozzle 54 may be configured for movement in a vertical direction (i.e., up-and-down) in order to accommodate, for example, different sizes of cups or containers into which ingredients are dispensed. That is, if there are three different cup sizes, small, medium, and large, the nozzle can be lowered to dispense ingredients into a small or medium cup, or raised to dispense ingredients in a larger or medium cup, as the case may be. In another example, the movement (e.g., raising or lowering) of the nozzle 54 is done to control the level from which an ingredient is dispensed to thereby control the quality of the beverage. For example, the dispensing level may be controlled to control bubble sizes for certain ingredients (e.g., foamed milk), and thus, control the foaming of the beverage. Accordingly, nozzle 54 may be moved vertically between multiple positions corresponding to different cup sizes. In such an embodiment, the nozzle 54 may be reciprocated along an axis towards and away from a cup/container support structure of the kiosk 12 that is configured to support a container into which the nozzle 54 dispenses one or more beverage ingredients.

Additionally, or alternatively, the nozzle 54 may be configured for angular or rotational movement about a pivot or rotational axis. Such movement may allow the nozzle 54 to move between or to different dispensing positions where a container may be placed or hold. Such movement may also allow for the adjustment of or change to the angle at which ingredients are dispensed from the nozzle 54 into a cup/container (e.g., an oblique angle relative to, for example, an axis that is transverse (e.g., perpendicular or substantially perpendicular) to the pivot axis). In certain instances, the dispensing angle may be adjusted in order to control bubble sizes for certain ingredients (e.g., foamed milk), and thus, control the foaming of the beverage. More specifically, if certain ingredients are directed toward the bottom of the cup/container, the agitation resulting from the ingredient impacting the bottom of the container will cause bubbles to form. Dispensing that or those ingredients at an angle so that the ingredient is directed against the inside wall of the cup/container rather than the bottom of the cup/container serves to prevent or at least limit the formation of such bubbles. In at least some embodiments, the nozzle 54 may be moved both vertically and angularly so as to dispense ingredients at a particular angle and to dispense the ingredients against an inside wall of the cup at a particular point relative to, for example, the rim of the cup (e.g., a certain desired distance below the rim of the cup).

In any event, in an embodiment wherein the nozzle 54 is configured for movement, the kiosk 12 (or one or more process modules 20 and/or beverage production stations 48 thereof) may include a nozzle assembly that includes, in part, the nozzle and one or more electromechanical actuators operatively coupled thereto and configured to effect movement of the nozzle in one or more dimensions. For purposes of this disclosure, "operatively coupled" is intended to mean that two components are either directly coupled together, or indirectly coupled with one or more intermediate components disposed therebetween. In any event, FIGS. 5 and 6 depict an illustrative embodiment of a nozzle assembly or dispensing mechanism assembly 70 that includes a dispensing mechanism or nozzle 54 and first and second electromechanical actuators 72, 74.

Figure 5:
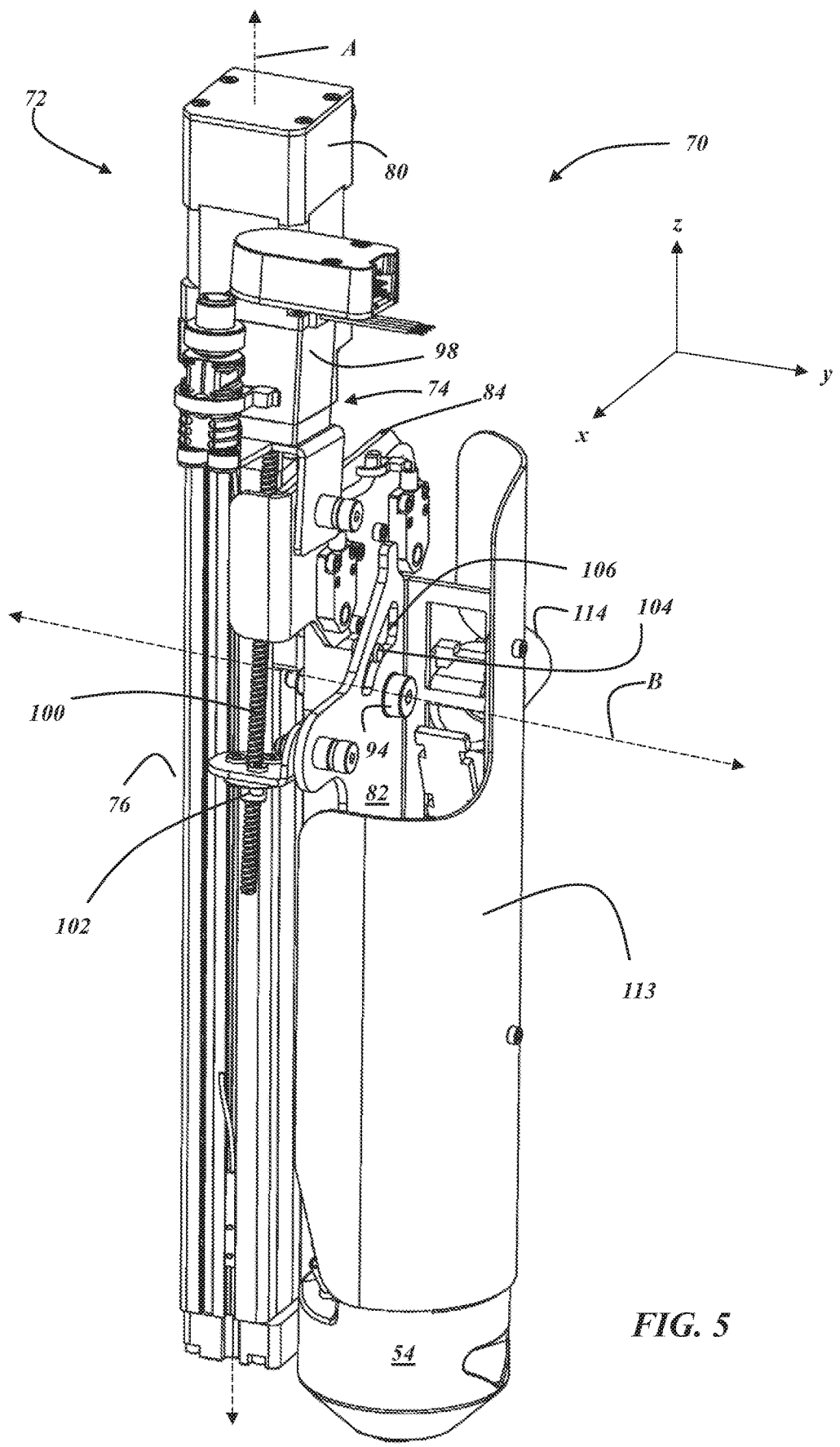
FIG. 5 is an isometric view of an illustrative embodiment of a dispensing mechanism assembly of a beverage-producing kiosk, for example, the kiosk illustrated in FIG. 2.

As illustrated in FIGS. 5 and 6, the first electromechanical actuator 72 comprises a linear actuator and includes a guide rail 76 defining a longitudinal axis A, a block 78 (best shown in FIG. 6) configured to travel along guide rail 76, and a motor 80 (e.g., a stepper motor) configured to drive movement of the block 78 along the rail 76 (i.e., the output of the motor is operatively coupled to the block of the actuator). More specifically, in an embodiment, the block 78 is configured to travel along the guide rail in a first direction when the motor output is in one direction (e.g., counterclockwise), and in a second direction when the motor output is in a second direction (e.g., clockwise). The nozzle 54 is carried by and operatively coupled to the block 78 such that the nozzle 54 moves along with the block 78 as the block travels or reciprocates along the guide rail 76 and thus axis A. Accordingly, in an embodiment, the actuator 72 is configured to effect axial movement (e.g., vertical up and down movement) of the nozzle 54 relative to axis A toward and away from a cup/container support structure of the kiosk 12 and within a vertical plane that contains the z-axis shown in FIGS. 5 and 6. In another embodiment, in addition to moving the nozzle 54 axially, the actuator 72 may be configured to rotate the nozzle 54 about the axis A. For example, the actuator 72 may include a second motor (not shown) that is configured to drive the rotation of the block 78 or the rail 76 of the actuator 72 about the axis A. In another embodiment, the nozzle assembly 70 may include a separate actuator to effect the rotational movement. The rotational movement may allow for the movement of the nozzle 54 amongst, for example, various dispensing locations (e.g., different cup/container support structures of the kiosk).

Again, the nozzle 54 may be coupled directly to the block 78 or may be indirectly coupled thereto with one or more other intermediate components of the nozzle assembly 70 being disposed between the nozzle 54 and the block 78. In the particular embodiment illustrated in FIGS. 5 and 6, the nozzle 54 is carried by an arm 82 and the arm is operatively coupled to the block 78 one or more components disposed therebetween, for example, a carriage 84 and a carriage spacer 86 (best shown in FIG. 6) disposed between the arm 82 and the block 78.

As will be described in greater detail below, in at least certain embodiments, the nozzle 54 is configured to be pivoted or rotated about a pivot axis. In the embodiment illustrated in FIGS. 5 and 6 wherein the nozzle 54 is carried by and operatively coupled to the arm 82, the arm is pivotally or rotatably coupled to one or more other components of the nozzle assembly 70, and is configured for rotational movement relative to that or those other components. In the embodiment illustrated in FIGS. 5 and 6, the arm 82 is pivotally coupled to the carriage spacer 86. More specifically, the arm 82 has an aperture 88 therein that can be aligned with an aperture 90 in the carriage spacer 86, which has one or more ball bearing assemblies 92 disposed therein. A pin 94 may be inserted through the two apertures 90, 92 and secured with a nut 96 having threads that complement a threaded portion of the pin 94. In such an embodiment, an axis extending through the aligned apertures 90, 92 and fastener 94 defines an axis of rotation or pivot axis B about which the nozzle 54 rotates or pivots, which will be described in greater detail below. It will be appreciated that while one particular coupling arrangement has been described, other suitable arrangements are certainly possible.

Figure 7:
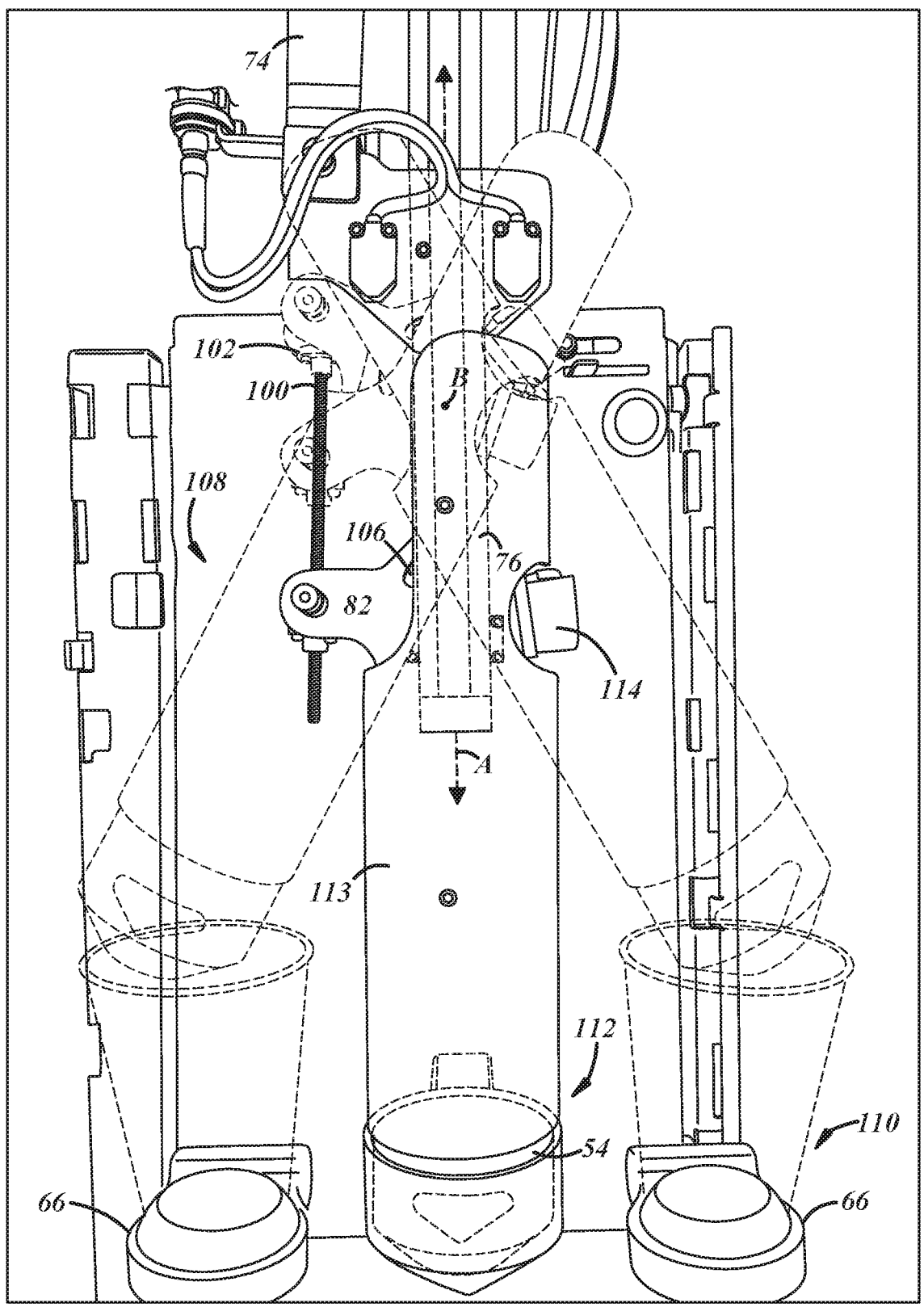
FIG. 7 is an elevation view of the dispensing mechanism assembly illustrated in FIGS. 5 and 6.

As illustrated in FIGS. 5 and 6, like the first electromechanical actuator 72, the second electromechanical actuator 74 may also comprise a linear actuator. The second actuator 74 is configured to effect angular or rotational movement of the nozzle 54 about a pivot axis, which in at least some embodiments is transverse (e.g., perpendicular or substantially perpendicular) to the longitudinal axis A of the guide rail 76 of the first actuator 72 and/or an axis relative to which the nozzle is configured to reciprocate toward and away from a cup/container support structure. For example, in the illustrated embodiment shown in FIGS. 5-7, the actuator 74 is configured to effect angular or rotational movement about axis B and, in an embodiment, within the vertical plane containing both the x-axis and z-axis (i.e., the xz-plane). Thus, in an embodiment, the vertical movement effected by the first actuator 72 and the angular movement effected by the second actuator 74 are within a common movement plane (e.g., the xz-plane shown in FIGS. 5 and 6). It will be appreciated that depending on the particular arrangement and orientation of the first actuator 72 and/or second actuator 74, the movement effected or imparted by the first and/or second actuator may be within one or more movement plane(s) in addition to or instead of the xz-plane, and thus, the present disclosure is not intended to be limited to movement within any particular movement plane(s).

In the illustrated embodiment, the second actuator 74 comprises a screw driven or ball screw type actuator comprising a motor 98, a threaded shaft or screw 100 coupled to the output shaft of the motor and configured to be driven thereby, and a ball or nut 102 mounted to the screw 100 and configured to travel along the screw 100 in a first direction when the screw is driven in one direction (e.g., counterclockwise), and in a second direction when the screw is driven in the opposite direction (e.g., clockwise).

In an embodiment, the nozzle 54 is operatively coupled to the ball or nut 102 of the second actuator, and thus, may be directly coupled to the nut 102 or indirectly coupled thereto via or through one or more other components of the nozzle assembly 70. In the embodiment illustrated in FIGS. 5 and 6 wherein the nozzle assembly 70 includes the arm 82, the arm is coupled to the nut 102, and thus, the nozzle 54 is indirectly coupled to the nut. In addition to being operatively coupled to the nut, as discussed above, the nozzle 54 is also configured to rotate or pivot about a pivot axis. In the embodiment illustrated in FIGS. 5 and 6 wherein the arm 82 is pivotally coupled to the carriage spacer 86, as the motor 98 of the second actuator 74 drives movement of the nut 100 in a first direction (e.g., towards the motor 98), the arm 82 and the nozzle 54 carried thereby rotate or pivot about the pivot axis B in a first direction (e.g., clockwise), while as the motor 98 drives movement of the nut 102 in the opposite direction (i.e., away from the motor), the arm 82 and the nozzle 54 rotate or pivot about the pivot axis B in a second direction (e.g., counterclockwise).

In addition to the above, in an embodiment, the carriage spacer 86 (or another component to which the nozzle is operatively coupled for rotation) may include a pin 104, and arm 82 includes a curved or arcuate slot 106 configured to receive the pin 104. As the second actuator 74 drives the rotational movement of the nozzle 54 in a first direction, the slot 106 moves relative to the pin 104 in the first direction, and as the end of the slot 106 reaches the pin 104, the pin and slot act as a mechanical stop. Similarly, as the second actuator 74 drives the rotational movement of the nozzle 54 in a second, opposite direction, the slot 106 moves relative to the pin 104 in the second direction, and as the end of the slot 106 reaches the pin 104, the pin and slot again act as a mechanical stop.

In an embodiment such as that illustrated in FIGS. 5 and 6, the second actuator 74 is carried by the first actuator 72. More specifically, the second actuator is operatively coupled to the block 78 of the first actuator 72 such that it moves along with the block 78, nozzle 54, and other components carried by the block 78 as the motor 80 of the first actuator 72 drives movement of the block 78. In other embodiments, however, the second actuator 74 may not be operatively coupled with or carried by the first actuator 72 and the block 78 thereof, in particular. Accordingly, the present disclosure is not intended to be limited to any particular arrangement of first and second actuators 72, 74.

In any event and as at least briefly described above, angular or rotational movement of nozzle 54 may serve a number of purposes. For example, and with reference to FIG. 7, the nozzle 54 may be rotated or pivoted amongst different dispensing positions (indicated by reference numerals 108 and 110 in FIG. 7) that may correspond to respective container support structures 66, a cleaning position (indicated by reference numeral 112 in FIG. 7), and/or one or more other positions based on one or more attributes of the kiosk 12. The nozzle 54 may also be rotated or pivoted continuously or in predetermined increments (e.g., 5-10 degree increments) to a particular angle (e.g., acute, non-zero angle) relative to and axis that is transverse (e.g., perpendicular) to the pivot axis B (e.g., the axis A of the guide rail 76 of the first actuator 72) in order to dial in or fine tune the dispensing angle of the nozzle 54 to a predetermined optimum dispensing angle for that ingredient and/or a specified/ordered beverage.

While the description above has thus far been generally limited to an embodiment wherein nozzle assembly 70 comprises two linear actuators for moving the nozzle 54 in two dimensions, it will be appreciated that the present disclosure is not intended to be limited to such an arrangement or configuration. Rather, in other embodiments that remain within the spirit and scope of the present disclosure, nozzle assembly 70 may include more or less than two actuators and/or one or more actuators that are other than linear actuators, and/or one or more actuators configured to move nozzle 54 in more than two dimensions. For example, in an embodiment, the nozzle assembly 70 may include a robotic arm and/or an XYZ actuator having multiple degrees of freedom configured to carry a nozzle and move it in multiple dimensions. In other embodiments, one or both of actuators 72, 74 may be configured to effect movement in more than two dimensions. Accordingly, multiple arrangements/configurations may be used and therefore the present disclosure is not intended to be limited to any particular one arrangement/configuration.

In any event, in an embodiment, one or both of first and second actuators 72, 74 is/are electrically connected to and configured to be controlled by the ECU 18 of the kiosk 12. In other embodiments, however, an ECU other than the ECU 18, or another suitable component of kiosk 12, may control the operation of actuator(s) 72, 74, and thus, movement of the nozzle 54. In such an embodiment, the ECU 18 may provide instructions or commands to the ECU configured to control the actuator(s).

In either instance, movement of the nozzle 54 may be dependent on a number of factors, including, but certainly not limited to, the location of the cup/container into which ingredients are to be dispensed from the nozzle 54, the size of that cup/container; and the type of beverage or ingredient being dispensed from the nozzle 54 into the cup/container. Such a movement may be changed or adjusted depending on the type of ingredient and/or the recipe for the beverage, or alternatively continuously or dynamically during the dispensing of a particular ingredient in order to affect a desired effect (e.g., bubble size, consistency, etc.) depending on the ingredient and/or the recipe for the beverage. Alternatively, such control may also be dependent on any other factors relating to the operation of the kiosk 12 and the construction of the beverage (e.g., temperature and/or pressure of the surroundings, the nozzle 54, and or the ingredient(s)) and information relating to that or those factors may be obtained from, for example, Accordingly, in an embodiment, the ECU 18 is configured to determine (1) whether the nozzle 54 needs to be moved to a particular dispensing location, and/or (2) based on the received order for the beverage being generated, whether the nozzle 54 must be moved in one or more linear or angular directions. If it is determined that movement in or more directions is required, the ECU 18 is configured to either command actuator(s) to effectuate such movement, or to provide instructions to one or more another ECU(s), which, in turn, command(s) the actuator(s) to effectuate such movement. In either instance, the movement may be effectuated before or during the dispensing of an ingredient, as the case may be.

In addition to the components of the nozzle assembly 70 described above, the nozzle assembly may include one or more other components. For example, the nozzle assembly may include a cover piece 113 for covering one or more other components of nozzle assembly 70 (e.g., the arm 82 and a portion of the nozzle 54). In an embodiment such as that illustrated in FIG. 6 wherein the nozzle 54 includes one or more ports 68 to which respective one or more ingredient pathways or dispensing tubes may be connected, the arm 82 may also include a conduit 114 through which that or those dispensing tubes may be routed to the nozzle 54. Those having ordinary skill in the art will appreciate that the nozzle assembly 70 (or the actuators 72, 74 thereof) may also include one or more components (e.g., limit switches, sensors, etc.) that may be used in the monitoring and control the movement of the actuator(s) 72, 74 and thus the nozzle 54. Accordingly, it will be appreciated that the nozzle assembly 70 may include any number of components in addition to those described herein, and/or may have less than all of the components described herein.

In addition to the components described above, in an illustrative embodiment such as that illustrated in FIG. 2, the kiosk 12 may further comprise one or more additional components such as, for example, a cup handler 115 and a lid dispenser 116. In one embodiment, these two components may be combined into a single apparatus, while in other embodiments they may be separate and distinct from each other. In an illustrative embodiment, the cup handler 115 is configured to handle or control a cup/container into which a specified beverage being produced by the kiosk 12 is ultimately dispensed or in which a beverage being produced is actually generated. The cup handler 115 may comprise one or more actuators (e.g., XYZ actuators) configured to move or manipulate the position of a cup/container amongst various locations within the kiosk 12 during production of an ordered or specified beverage. In various embodiments, these locations may include, for example: a location where empty cups are stored; a location where the beverage is dispensed into the cup (e.g., a location where a mixing chamber is disposed); locations corresponding to various process modules 20 or beverage production stations 48 at which different ingredients or components of the beverage may be added or dispensed into the cup; locations where partially completed and/or completed beverages are temporarily stored; a location corresponding to the lid dispenser 116; and a location where a beverage presenter component of the kiosk 12 is disposed. In an illustrative embodiment, the operation of the cup handler 115 is controlled by the ECU 18 of the kiosk 12; though in other embodiments the cup handler may be controlled by another suitable component.

In an embodiment wherein the kiosk 12 includes a lid dispenser, the lid dispenser 116 is configured to dispense lids for placement on cups containing completed or partially completed beverages. As with the cup handler 115, the lid dispenser 116 may comprise one or more actuators (e.g., XYZ actuators) configured to acquire a lid and to place it on the top of a cup. Accordingly, in an illustrative embodiment, when it is determined that a lid should be placed on a particular cup, the lid dispenser 116 is configured to acquire a lid from a lid storage area in the kiosk 12 and place it onto the cup/container. As with the cup handler 115, in an illustrative embodiment, the operation of the lid dispenser 116 may be controlled by the ECU 18 or another suitable component of the kiosk 12.

With continued reference to FIG. 2, in an illustrative embodiment, the kiosk 12 further comprises one or more beverage presenters 118. Beverage presenter(s) 118 serve to transfer a completed beverage to an area at which customers may retrieve the beverages they ordered. In an illustrative embodiment, the beverage presenter 118 may include, for example, a conveyor or carrousel upon which the cup handler 115 places a completed beverage and that moves or delivers the beverage to, for example, a customer-accessible presentation or final product collection area where the beverage may be retrieved by the user/customer. This presentation area may comprise, for example, an area behind a door or window that is accessible upon the door or window opening. More particularly when a beverage is ready for retrieval by the corresponding customer, it is placed into the presentation area. When the kiosk 12 recognizes that the customer has arrived or is in vicinity of the kiosk 12 (e.g., through an input to a user interface 16 of the kiosk 12), the door or window to the presentation area may be opened so that the customer may access the presentation area and retrieve his/her beverage. In various embodiments, the kiosk 12 may include one or more presentation areas that may be utilized to present beverages ordered in different ways (e.g., one presentation area for beverages ordered directly at the kiosk 12 for immediate delivery, and another presentation for pre-ordered beverages that are ordered in advance of a desired pick-up time). As with other components described above, in an illustrative embodiment, the operation of presenter 118 and/or presentation or final product collection area may be controlled by the ECU 18 or another suitable component of the kiosk 12.

In view of the foregoing, it will be apparent that some or all of the components of the kiosk 12 are interconnected to allow for communication and exchange of information therebetween. This communication may be through a central interconnect (e.g., a communication bus), or alternatively, one or more components may be electronically connected (e.g., by one or more wires or cables, or wirelessly) to one or more other components. It is through this communication that the ECU 18 may receive feedback and other inputs from the other components of the kiosk 12 (e.g., process modules 20, actuator 72, actuator 74, the cup handler 115, the lid dispenser 116, the presenter 118, various sensors, various valves, etc.) and may issue commands (e.g., in the form of machine instructions or signal values) to some or all of those components. In various embodiments, one or more of the user interfaces 16, such as, for example, a touch screen, a proximity sensor, an RFID sensor, an audio interface (including a microphone and/or speaker), a video capture device, a face recognition mechanism, fingerprint identification mechanism, etc., may provide a customer interface and/or maintenance interface, as controlled by the ECU 18.

In various embodiments, the kiosk 12 may further comprise one or more components that is/are configured to sense or otherwise acquire various parameters related to ingredients that are used in the kiosk 12. For example, various sensors 119 (diagrammatically shown in FIG. 1) may be used to sense one or more parameters or aspects of certain ingredients, which may allow the ECU 18 to use these parameters in the control of one or more process modules. For example, the kiosk 12 may include one or more sensors each configured to measure the amount of one or more ingredients stored in the kiosk 12, the amount of ingredient that has been dispensed during the generation of a specified beverage, and/or the amount of time that has elapsed during the dispensing of an ingredient.

In an embodiment, wherein the kiosk 12 includes one or more sensors that may be used particularly to detect and monitor the amount of an ingredient that has been dispensed and/or the amount of time that has elapsed during the dispensing of an ingredient, the information sensed or detected by that or those sensors may be communicated to the ECU 18 or another suitable component of the kiosk 12 or the system 10. That information may then be used to determine if a switch from one ingredient supply to another is necessary or would be desirable.

For example, in an embodiment, the kiosk 12 may include a sensor comprising an in-line flowmeter configured to measure the flow rate of an ingredient during a dispense operation. Flow rate information detected or measured by the flowmeter during each dispensing operation may be communicated to the ECU 18. The ECU 18 may compute a running average of dispense flow rates, and compare the most recently received flow rate against the running average for that particular ingredient and ingredient source. If, based on that comparison, it can be determined that a particular supply source of the ingredient has been depleted or is close to empty (e.g., the detected flow rate is higher or lower than a predetermined tolerance and is indicative of, for example, air being introduced into the dispense line), the ECU 18 may effectuate a switch over to a secondary supply source until the first supply source is replenished. This may be accomplished by the ECU 18 controlling or commanding the control of one or more valves or switches between, for example, the two supply sources and one or more supply lines/tubes.

In other embodiments, sensors other than flowmeters may be utilized for the purposes described above, and such embodiments remain within the spirit and scope of the present disclosure. For example, in another embodiment, the kiosk 12 may include a sensor comprising a vacuum switch that may be used to fail over to a secondary supply source if a vacuum in a first or primary supply source is detected. Thus, the present disclosure is not intended to be limited to the use of any particular type or number of sensors for the purposes described above. In any event, the sensors described above may be electrically connected to the ECU 18, and as such, the information sensed or detected by that or those sensors may be provided to the ECU 18 and may be used to control one or more processes performed during the generation of a specified beverage and/or to control or manage the inventory and/or dispensing of ingredients.

It will be appreciated that while certain components of the kiosk 12 have been specifically identified and described above, the kiosk 12 may include additional components, such as, for example, those that are described herein below. Conversely, it will be further appreciated that in certain embodiments, one or more of those components specifically identified above may not be included in the kiosk 12. Accordingly, the present disclosure is not meant to be limited to any one arrangement of the kiosk 12.

In an illustrative embodiment, in addition to the kiosk 12, the system 10 includes the central host 14. As illustrated in FIG. 1, and as will be appreciated by those having ordinary skill in the art, the central host 14 may be implemented with a combination of hardware, software, and/or middleware, and in an illustrative embodiment, utilizes a cloud computing architecture. In an embodiment, the central host 14 comprises a host server including one or more databases. The central host 14 may include one or more network or communication interfaces that may include or be electronically connected to, and configured for communication with, certain communication-supporting infrastructure (e.g., one or more known components/devices, such as, for example, routers, modems, antennas, electrical ports, transceivers, etc.) and be configured to communicate with various components of the system 10, including, for example, the kiosk 12 and software applications (commonly known as "apps") executed on various types of user devices (e.g., computers, smart phones, tablets, etc.), via a public or private network (e.g., the internet) or using other suitable communication techniques or protocols, such as, for example, those described below. In an illustrative embodiment, the central host 14 is located remotely from the kiosk 12 (e.g., anywhere from a few feet to any number of miles from the kiosk 12). Alternatively, the central host 14 may be disposed within the housing of one of the kiosks of the system 10, and therefore, may form part of that particular kiosk.

The central host 14 may be configured to perform or cause to be performed (e.g., command) any number of functions and to serve any number of purposes, including, for example and without limitation, those described below. For example, the central host 14 may store and in certain instances manage a variety of information, such as, for example, customer-specific information and/or data and process or operational-related information for one or more kiosks 12 (e.g., beverage recipes, beverage production queues, empirically-derived profiles to be used in beverage production, component performance information, etc.). As was briefly described above, the central host 14 may be further configured to monitor and manage the operation of one or more kiosks 12 and/or to provide other functionality for efficiently operating one or more kiosks 12.

As was also described above, the central host 14 may be further configured to send requests to one or more kiosks 12 to acquire various operational information from the kiosks (e.g., information relating to inventory, sales information, performance data, environmental information, information relating to the cleaning of components of the kiosk, customer-specific information, etc.), to receive responses containing the requested information, and to then store the requested information in one or more databases thereof, for example. The central host 14 may be further configured to respond to requests or inquiries from kiosks 12.

In addition to the above, the central host 14 may be further configured to send instructions to a kiosk of the system 10, and the ECU thereof, in particular, instructing it to perform certain tasks, such as, for example, to commence production of a given beverage, to shut down operation of one or more components, the clean or sanitize one or more components, and/or to display certain messages or content on a user interface thereof, to name but a few. Accordingly, it will be appreciated that in various embodiments, the central host 14 may be configured to exert a measure of control over some or all of the features and functionality of the kiosk(s) 12 of the system 10.

As was briefly described above, the central host 14 may also serve as an interface to the system 10, and the kiosk(s) 12 thereof, in particular, for customers wishing to place beverage orders remotely from the kiosks 12 (e.g., via an internet web browser, smart phone application, etc.). Accordingly, in an illustrative embodiment, the central host 14 may be configured to receive requests to produce one or more beverages placed through, for example, GUIs or text-based interfaces displayed on various customer devices.

For example, the central host 14 may be configured to generate or interface with GUIs or text-based interfaces having user-selectable or user-inputtable fields or links that allow for the ordering and, in certain embodiments, customization of various beverages. These orders may then be communicated from the central host 14 to one of kiosk(s) 12 of the system 10, and, in certain embodiments, the ECU 18 thereof in particular.

In an embodiment wherein the system 10 comprises a plurality of kiosks 12, the central host 14 may be further configured to determine which kiosk 12 is best equipped produce the customer's requested beverage. This determination may be based on, for example, the ability of a kiosks to produce the requested beverage (e.g., in view of the availability of ingredients for the specified beverage, the operation state of the kiosk, etc.), the location of the customer relative to one or more kiosks, and/or other parameters or factors, such as, for example, current traffic conditions that may be acquired or obtained by the central host 14. In such an embodiment, the central host 14 may be further configured to either advise a customer which kiosk to go to, to suggest a particular kiosk, or to present the customer with a number of options from which the customer may pick.

It will be appreciated that while certain functions performed or served by the central host 14 have been specifically identified above, the present disclosure is not intended to be limited to the central host being configured to perform or serve only those functions. Rather, it will be appreciated by those having ordinary skill in the art that the central host 14 may be configured to perform any number of additional functions, for example, those described elsewhere herein, or to perform less than all of those functions described herein. Accordingly, it will be appreciated that central hosts configured to perform more or less functions than those described herein remain within the spirit and scope of the present disclosure.

As briefly described above, and as will be described in greater detail below, in an illustrative embodiment, the system 10 may comprise two or more kiosks 12 that are configured to communicate both with the central host 14 and each other. Accordingly, in an illustrative embodiment, the system 10 comprises a plurality of distributed kiosks 12 networked together to generally allow for, among other things, communication and exchange information amongst each other, as well as between the kiosks 12 and the central host 14. In such an embodiment, each kiosk 12 may be configured both structurally and operationally in the same manner as that described above and below, or one or more kiosks may vary in structure and/or operation from one or more of the other kiosks 12 of the system 10 (e.g., one kiosk may have different process modules or other components than another kiosk, one kiosk may be configured to generate different beverages as compared to other kiosks, etc.).

For example, in an embodiment, the system 10 may include a main or primary kiosk 12 and a group of other standalone kiosks 12 in the form super-automatic machines that have pared-down functionality as compared to the primary kiosk. The primary kiosk may be configured to receive an order for a beverage and to determine where to product the beverage, i.e., either at the primary kiosk or at one of the other kiosks. In an instance wherein it is determined that the beverage is to be generated or produced at a kiosk other than the primary kiosk, the primary kiosk may communicate the order and other relevant information relating thereto to that machine and command or instruct the machine to generate the beverage. This arrangement or architecture provides the ability to distribute the beverage-generating load of the system 10 and easily provides additional resources and beverage making capacity to the system 10.

In an embodiment wherein the system 10 comprises multiple kiosks 12 configured to communicate and exchange information with both central host 14 and each other kiosks, this communication and exchange of information may be facilitated across a network through one or more network or communication interfaces of the individual components (such as, for example, network interfaces 42 of the kiosks 12 that may include or be electronically connected to and configured for communication with certain communication-supporting infrastructure (e.g., routers, modems, antennas, electrical ports, transceivers, etc.)).

More particularly, the network interfaces of the individual components may support communication via one or more wired or wireless networks, such as, for example, a suitable Ethernet network; via radio and telecommunications/telephony networks, such as, for example and without limitation, cellular networks, analog voice networks, or digital fiber communications networks; via storage area networks such as Fibre Channel SANs; or via any other suitable type of network and/or protocol (e.g., local area networks (LANs); wireless local area networks (WLANs); broadband wireless access (BWA) networks; personal Area Networks (PANs) such as, for example, Bluetooth; etc.). The network or communication interfaces of the various components may use standard communications technologies and protocols, and may utilize links using technologies such as, for example, Ethernet, IEEE 802.11, integrated services digital network (ISDN), digital subscriber line (DSL), and asynchronous transfer mode (ATM), ZigBee, near field communications (NFC), as well as other known communications technologies. Similarly, the networking protocols used on a network to which the kiosks 12 and the central host 14 are interconnected may include multi-protocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. Further, the data exchanged over such a network by the network interfaces of the various components may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as, for example, the secure sockets layer (SSL), Secure HTTP and/or virtual private networks (VPNs), the international data encryption standard (DES or IDEA), triple DES, Blowfish, RC2, RC4, R5, RC6, as well as other known data encryption standards and protocols. In other embodiments, custom and/or dedicated data communications, representation, and encryption technologies and/or protocols may be used instead of, or in addition to, the particular ones described above.

In addition to the structural components of the system 10 described above, and the kiosk(s) 12 and the central host 14, in particular, in an illustrative embodiment the system 10 is further configured to support a variety of functions and features in addition to those already described above. As will be described in greater detail below, this additional functionality may be performed or executed by one or a combination of the components of the system 10, the individual kiosks 12, and/or the central host 14 described above, or one or more additional components not specifically described above either alone or in conjunction with one or more of the above-described components. Several of these various functions and features will now be described.

Producing Beverages

It will be appreciated in view of the above that in various embodiments, the system 10 and the methods described herein may allow for the kiosk 12 to produce or generate multiple types of beverages, and brewed beverages, in particular, using the same equipment. For example, in response to receiving a request for the production of one or more beverages, the kiosk 12, and the ECU 18 thereof, in particular, may be configured to control the production of the specified beverage(s) in accordance with a recipe and, in certain embodiments, one or more process profiles and/or operating parameters of system components that are used to optimize the production process and the quality of the end product. The ECU 18 may acquire the recipe and, if applicable, the process profiles and/or operating parameters, from a database that may be stored locally at the kiosk 12 (e.g., in or on a memory that is part of or accessible by the ECU 18), and/or remotely at, for example, the central host 14. Alternatively, at least a portion of a recipe and/or customer/user specifications may be obtained from the order itself (i.e., from the received electrical signal(s) as opposed to a database). As described above, the kiosk 12 may include a variety of process modules 20, each of which is configured to perform one or more chemical or mechanical processes that contribute to the production of brewed beverages. Accordingly, in an illustrative embodiment, the ECU 18 is configured to control the operation of one or more process modules 20 to generate or produce the specified beverage(s), and to then effect the presentation of the beverage to the corresponding user/customer.

With reference to FIG. 3, a brief and general description of an illustrative kiosk 12 that is configured to produce, for example, an espresso-based beverage will be provided to better illustrate the operation of the kiosk and the various components thereof.

In such an embodiment, one or more external inputs to the beverage production process may be received by one or more process modules 20 of kiosk 12. These inputs may include, for example, water 120 (e.g., through water supply), high-pressure gas 122, and beverage ingredients 124 (e.g., coffee grounds, additives, etc.). In other embodiments, one or more of these inputs to the beverage production processes may be sourced from within the kiosk 12 (e.g., from an internal water tank, internal gas tank, and/or internal ingredient storage tanks).

In the illustrated example, the kiosk 12 comprises a number of process modules, such as expressor unit 44, which, in this embodiment, takes the form of an espresso unit (i.e., "espresso unit 44"). Espresso unit 44 is configured to produce a coffee base 126. The kiosk 12 further comprises another process module in the form of a frothing unit 52, which may heat and/or froth milk and provide it as steamed milk 128. In the illustrated example, the kiosk 12 may further comprise a mixing chamber 130 in which base coffee 126, steamed milk 128, and/or other beverage ingredients 124 (e.g., flavored syrups, sweeteners, etc.) may be combined to produce a specified beverage 132.

In another illustrative embodiment, rather than dispensing ingredients or components of the beverage into a mixing chamber and then transferring the contents thereof to a cup that is then presented to the customer, one or more of the required ingredients may be dispensed directly into a cup/container that is ultimately presented to the user/customer. In such an embodiment, the container may remain stationary as the ingredients are dispensed therein, or it may be moved within the kiosk 12 between various locations at which ingredients are dispensed or other processes are performed (e.g., between various process modules 20, beverage production stations 48, etc., depending on the particular implementation). In any event, in the example illustrated in FIG. 3, if beverage 132 is an iced drink, a process module in the form of an ice unit 134 may provide ice 136 that may be dispensed into a container along with specified beverage 132.

More particularly, and as shown in FIG. 3, the espresso unit 44 may take water as an input and use it to brew a base coffee product 126, which, in some embodiments, may be immediately dispensed into a container in which the beverage is being generated (e.g., a cup or a mixing chamber) or may be stored in a receptacle for later use. The water may be supplied directly from a city water supply, or it may be stored in a storage tank that is located within the kiosk 12 such that gravity provides the flow of water to the espresso unit 44. In an embodiment wherein the mixing chamber 130 is used, the mixing chamber may receive the base coffee product 126 as an input and may then allow for the customization of the beverage, such as by adding sweeteners, diary (e.g., cold or steamed/frothed milk), water, flavored syrups, or other ingredients (i.e., additives), per the customer's or recipe's specification. In an embodiment wherein the beverage is generated in the cup/container in which it is ultimately presented to the user/customer, the cup may receive the base coffee product 126 as an input and may then allow for the customization of the beverage within the cup.

In the illustrated embodiment, the cup handler 115 and the lid dispenser 116, which may be combined as a single component, may receive the customized coffee product 132 as an input and may package it (in some cases along with ice 136) as a final product in a cup with a lid (shown as 138 in FIG. 3). As illustrated in this example, final product 138 may be stored in a staging area 140 prior to being presented to a customer at a presenter 118 (which may comprise one of several presenters 118 of the kiosk 12). In other embodiments, partially completed beverages and/or components thereof (e.g., base coffee or various combinations of ingredients) may be temporarily stored in a work-in-progress (WIP) staging area, which may comprise the same staging area in which completed beverages are stored (i.e., staging area 140), or a separate and distinct staging area.

In the illustrated embodiment, the cup handler 115 and the lid dispenser 116, which may be combined as a single component, may receive the customized coffee product 132 as an input and may package it (in some cases along with ice 136) as a final product in a cup with a lid (shown as 138 in FIG. 3). As illustrated in this example, final product 138 may be stored in a staging area 140 prior to being presented to a customer at a presenter 118 (which may comprise one of several presenters 118 of the kiosk 12). In other embodiments, partially completed beverages and/or components thereof (e.g., base coffee or various combinations of ingredients) may be temporarily stored in a work-in-progress (WIP) staging area, which may comprise the same staging area in which completed beverages are stored (i.e., staging area 140), or a separate and distinct staging area.

Figure 8:
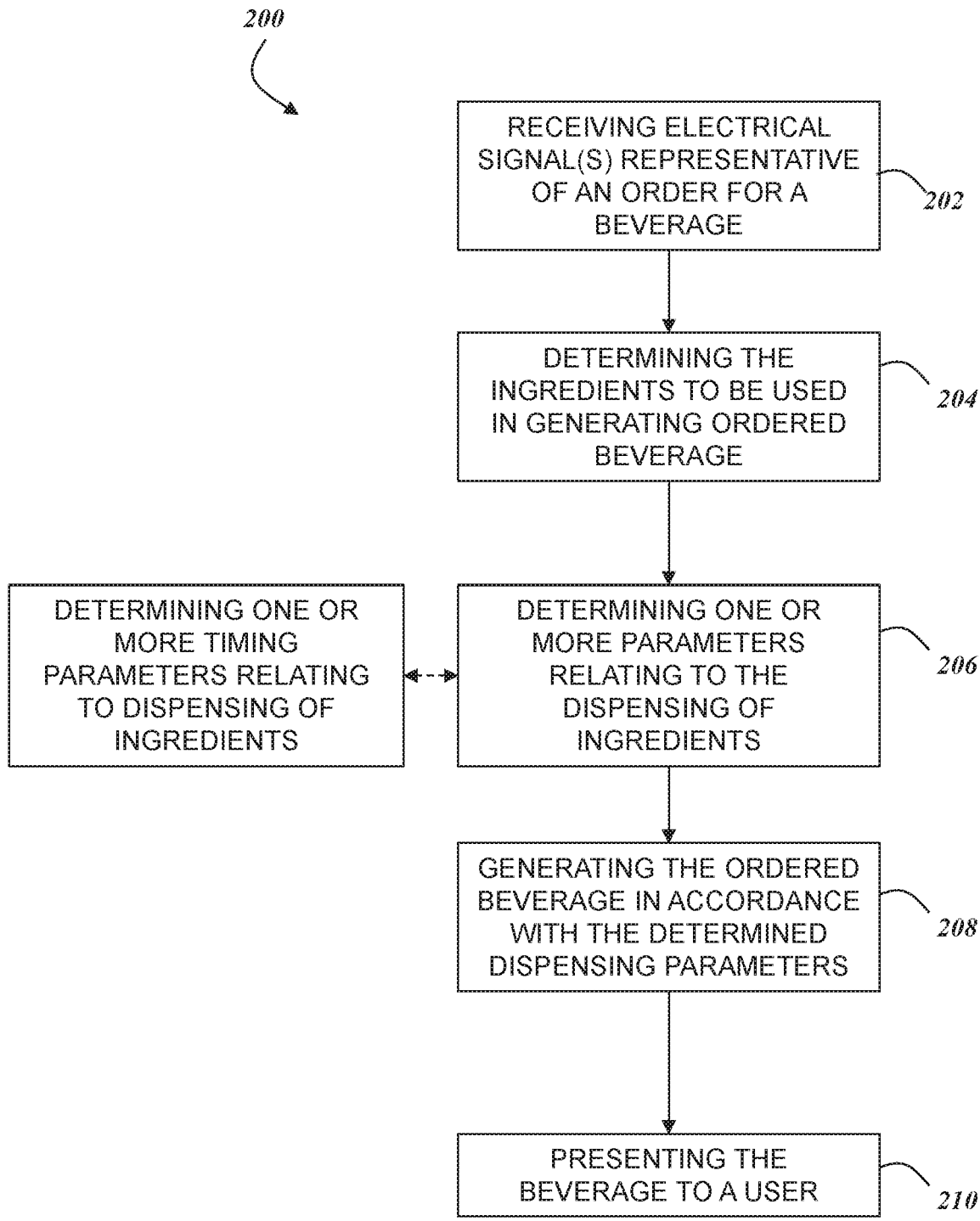
FIG. 8 is a flow diagram depicting various steps of an illustrative embodiment of a method of operating an automated beverage generating system, for example, the beverage generating system illustrated in FIG. 1.

With reference to FIG. 8, there is shown a method 200 of operating an automated beverage generating system to generate a specified beverage. For purposes of illustration and clarity, method 200 will be described only in the context of the automated beverage generating system 10 described above, and one or more certain implementations or embodiments of the kiosk 12 thereof, in particular. It will be appreciated, however, that the application of the present methodology is not meant to be limited solely to such implementations or embodiments, but rather method 200 may find application with any number of types or implementations/embodiments of automated beverage generating systems. It will be further appreciated that while the steps of method 200 will be described as being performed or carried out by one or more particular components of the system 10 (e.g., the ECU 18 of the kiosk 12), in other embodiments, some or all of the steps may be performed by components of the system 10/kiosk 12 other than that or those described. Accordingly, it will be appreciated that the present disclosure is not intended to be limited to an embodiment wherein particular components are configured to perform any particular steps. Additionally, it will be appreciated that unless otherwise noted, the performance of method 200 is not meant to be limited to any one particular order or sequence of steps; rather the steps may be performed in any suitable and appropriate order or sequence and/or at the same time.

In an embodiment, method 200 includes a first step 202 of receiving one or more electrical signals representative of an order for a specified beverage. In an embodiment, the electrical signals received in step 202, which may be received by the ECU 18 of the kiosk 12, may be generated in response to a user input that may be provided in a number of ways including, but certainly not limited to, those described below.

One way a user input may be provided is by placing an order for the beverage locally at the kiosk 12. This may be done using one or more of the interfaces 16 (e.g., a touch screen) that is configured to display one or more user-inputtable or user-selectable fields or links thereon to facilitate the ordering process. In such an embodiment, the ECU 18 may be configured to control the user interface(s) 16 to display such fields or links. A user may then interact with the appropriate user interface(s) 16 to place an order for, and if applicable, customize, a beverage. Another way an order may be placed locally at the kiosk 12 is by using one or more of the user interface(s) 22 that are not part of the kiosk 12, per se. More particularly, in an embodiment wherein a user input device such as, for example, a smart phone, personal computer, etc., and a component of the kiosk 12, for example, the ECU 18, are both connected to a local network (e.g., Wi-Fi, Bluetooth, etc.), a user interface in the form of one or more graphical or text-based interfaces generated by, for example, application software stored on the user device, may be displayed and used to facilitate the ordering process.

Regardless of how an order is placed locally at the kiosk 12, the ordering process is generally the same. For example, a user may interact with a graphical user interface (GUI) to select a particular beverage and, if applicable, a desired size of the beverage (e.g., small, medium, large). In certain embodiments, once a particular beverage has been selected, the user may be prompted and/or permitted to customize or modify the ordered beverage. This may be accomplished using the same or a different GUI, but in either instance, the user/customer may be presented with a number of selectable customization options including, for example, various additives or ingredients that may be used in the production of the beverage from which the user may make one or more selections. The user/customer may also be permitted to select or specify the amount or mass of each ingredient to be used, as well as to select or specify other parameters relating to the beverage such as, for example, a temperature (e.g., a particular value or a range of values) at which the user/customer would like the beverage when it is ultimately presented or retrieved, and/or a time at which the beverage will be retrieved at the kiosk 12 or another kiosk of the system 10.

Once the user has completed the order, it may be sent directly or indirectly to the ECU 18 which may then either immediately initiate production of the beverage (e.g., by controlling the operation of one or more process modules 20) or, as described in greater detail in U.S. Patent Publication No. 2013/0087050 incorporated herein by reference above, may cause the order to be entered into a production queue resulting in the production of the beverage being delayed until a particular time in the future.

Another way a user may provide the input is by placing an order for the beverage through the central host 14 when the user is located remotely from the kiosk 12 and outside of the range of a local network corresponding thereto. More particularly, the user may interact with the central host 14 using one or more user interfaces 22 in the form of one or more GUIs or text-based interfaces generated by, for example, application software stored on a user input device, for example, a personal computer, a smart phone or another suitable device. The one or more user interface(s) 22 may then be used by the user to make various selections relating to the beverage being ordered in the same manner as that described above. In certain embodiments, the user may also be permitted to make additional selections relating to, for example, a particular kiosk and/or time at which the user would like to retrieve the beverage.

In any event, once the user has completed the ordering process in at least some embodiments and/or in at least some instances, the order may be communicated to the central host 14. The central host 14 may then relay the order to the appropriate kiosk at which the beverage will be retrieved along with, in some embodiments, specific information relating to the order (e.g., recipes to be used, time at which to commence production, customer identifying information, etc.).

It will be appreciated that while certain functionality relating to the placement of orders through one or more user interfaces has been described above, the present disclosure is not intended to be limited to such functionality and/or the particular implementations thereof. Rather, in some embodiments, additional functionality and/or alternate implementations of the functionality described above may be included.

In any event, following the receipt of an order in step 202, method 200 may move to a step 204 of determining the ingredient(s) to be used in generating the ordered or specified beverage, and, in an embodiment, an amount or mass of one or more of the ingredient(s). In an embodiment, this determination is made by the ECU 18 of the kiosk 12 and may be made in any number of ways including, but not limited to, those described below and that described in U.S. Patent Publication No. 2014/0277703, the entire contents of which were incorporated by reference above An example of one way in which the determination is made is by interpreting the signal(s) received in step 202 which may include the recipe, or at least a portion thereof, for the ordered beverage. That is, the received signals may be processed by the ECU 18 to extract or translate the recipe for the order and thus to determine the specifications for the ordered beverage, including the particular ingredients to be used, their respective amounts, their timing and/or their order of dispensing. Another way is by using the order received in step 202 and a data structure, for example, a look-up table that correlates certain beverages with the recipes therefor, to determine the amounts of the ingredients to be used, their timing and/or their order of dispensing. Accordingly, in such an embodiment, step 204 may comprise inputting or looking up the ordered beverage in an appropriately configured, pre-populated data structure to determine the amount of the various ingredients to be used in the generation/production of the ordered beverage, their timing and/or their order of dispensing. The data structure may be stored in an electronic memory device that is part of or accessible by the ECU 18 of the kiosk 12. While the description above is primarily with respect to step 204 comprising determining an amount for each ingredient to be used in the generation of the ordered beverage, in other embodiments, the determination of the particular amount(s) for one or more of the ingredients may not be made as part of step 204 but rather may be made as part of another step of the method 200.

In an embodiment, method 200 further comprises determining one or more parameters relating to the dispensing of the ingredients to be used in generating the ordered or specified beverage. These parameters may include, but are certainly not limited to, the order or sequence in which the ingredients are dispensed, the timing associated with the dispensing of the ingredients (e.g., consecutively or at least partially concurrently) relative to the dispensing of other required ingredients, and in at least some embodiments, the positioning of one or more ingredient dispensing mechanisms (e.g., nozzles 54) used to dispense some or all of the ingredients required for generating the specified beverage. In an embodiment, determining one or more dispensing parameters may be part of step 204 (i.e., the information is part of the recipe for the ordered beverage). In other embodiments, such as, for example, that described below, the determination(s) being made may be made in a step 206 that is separate and distinct from step 204. In still other embodiments, one or more determinations may be made in step 204 and one or more determinations may be made in 206. Accordingly, it will be appreciated that the present disclosure is not limited to the determination(s) being made in any particular step. Additionally, in an embodiment, the determination(s) made may be made dynamically and in dependence on, for example, inputs received from one or more sensors 119 of the kiosk 12, user selections, and/or the status of the kiosk 12 and/or one or more components thereof (including, for example, environmental and ingredient conditions).

More specifically, for certain beverages, the order in which ingredients are dispensed into a cup/container, the timing of the dispensing (e.g., the amount of time that elapses during the dispensing of an ingredient, the amount of time that elapses during or after the dispensing of a first ingredient before the dispensing of a second ingredient commences, the amount of time that multiple ingredients are dispensed simultaneously, etc.), and/or the angle at which a nozzle dispenses at least certain ingredients (e.g., milk, syrup, etc.) into the cup/container may affect one or more of the quality, taste, and appearance of the beverage as the order, timing, and/or dispensing angle may directly affect how well the ingredients are blended in the cup. More specifically, and as it relates to the dispensing angle of the nozzle, in various embodiments, the position or angle of the nozzle may be adjusted during the dispensing of an ingredient, as well as between the dispensing of various ingredients in order to control, for example, one or more of the quality, taste, and appearance of the beverage (e.g., the bubble size of ingredients, the color, consistency, etc.).

For example, to achieve a white top on a cappuccino or latte, the foamed milk must enter the cup before the espresso, otherwise the beverage will appear brown. And in certain instances, to properly blend sweeteners and flavored syrups, those ingredients should be dispensed while milk or hot water is also being dispensed. For example, chocolate mixes well when it is dispensed into a stream of hot foamed milk. If it is not timed well, the chocolate settles on the bottom of the cup, which may adversely affect the taste and quality of the beverage. By way of illustration, if the flow rate of a chocolate additive is 400 ms/ml and 20 ml are to be dispensed, dispensing of the chocolate will commence eight (8) seconds before the dispensing of a milk product will be complete. Accordingly, dispensing parameters may be determined in an effort to control the quality, taste, and/or appearance of the specified beverage (e.g., to control the temperature of the dispensed ingredients or beverage as a whole, the consistency of the dispensed ingredients or beverage as a whole, and/or the bubble size of ingredients).

In any event, in embodiment wherein the timing of the dispensing of different ingredients is determined in step 206, this step may comprise determining one or more timing parameters for the dispensing of one or more ingredients relative to the dispensing of one or more other ingredients. The timing parameter(s) may take a number of forms.

One such timing parameter is a wait time between the completion of the dispensing of a first ingredient and the commencing of the dispensing of a second ingredient. Such a timing parameter may be used in an instance where, for example, it is desirable or beneficial for the first ingredient to be completely dispensed and to settle in the container before the second ingredient is added to the first ingredient. The wait time or delay between the completion of the dispensing of the first ingredient and the commencement of the dispensing of the second ingredient may be a predetermined, empirically-derived period of time that is tailored to the first and/or second ingredient(s).

Another timing parameter that may be determined in step 206 is a wait time between the commencement of the dispensing of a first ingredient and the commencement of the dispensing of a second ingredient. Such a timing parameter may be used in an instance where, for example, it is desirable or beneficial for a particular amount or quantity of the first ingredient to be dispensed prior to the dispensing of the second ingredient, but may also be desirable or beneficial for the dispensing of the first and second ingredients to at least partially overlap in time. As with the parameter described above, the wait time or delay between the commencement of the dispensing of the first and second ingredients may be a predetermined, empirically-derived period of time that is tailored to the first and/or second ingredient(s). Such a timing parameter may also be used in an instance where the dispensing of the first and second ingredients is to take place at the same time, in which case the wait time parameter will be zero.

Yet another timing parameter comprises an amount of a first ingredient that is dispensed before the dispensing of a second ingredient commences. Similar to the timing parameter described immediately above, such a timing parameter may be used in an instance where, for example, it is desirable or beneficial for a particular amount or quantity of the first ingredient to be dispensed prior to the commencement of the dispensing of the second ingredient, but may also be desirable or beneficial for the dispensing of the first and second ingredients to at least partially overlap in time. The particular amount of the first ingredient that must be dispensed prior to the commencement of the dispensing of the second ingredient may be a predetermined, empirically-derived quantity/amount that is tailored to the first and/or second ingredient(s).

Yet still another timing parameter comprises a temperature value the first ingredient reaches before the dispensing of the second ingredient commences. The temperature of the first ingredient may be measured before it is dispensed, while it is being dispensed, or after it has been dispensed into a container. In each instance, an appropriately positioned temperature sensor is configured to measure the temperature of the first ingredient and that temperature is communicated to, for example, the ECU 18 or another suitable component of the kiosk 12. Once the first ingredient reaches a predetermined, empirically-derived temperature, dispensing of the second ingredient commences.

While certain timing parameters have been specifically identified and described above, the present disclosure is not intended to be limited to any particular timing parameter(s), rather any suitable timing parameter may be used in addition to or instead of those described above.

In an embodiment wherein step 206 includes determining a timing parameter, method 200 may further include a step (not shown) of determining one or more parameters of one or more beverage production processes (e.g., chemical or mechanical processes performed by one or more process modules 20) for producing the ordered beverage based on the determined timing parameter. More specifically, this step may comprise, for example, controlling the time(s) at which processes for producing ingredients for the ordered beverage are performed, including, for example, frothing processes, brewing processes, etc.

As briefly mentioned above, step 206 may additionally or alternatively comprise determining one or more parameters relating to the position of ingredient dispensing mechanisms. More particularly, in an embodiment wherein the kiosk 12 is configured to accommodate containers of different sizes and/or has multiple dispensing locations at which a particular dispensing mechanism 54 may dispense ingredients, step 206 may comprise determining what movement of the dispensing mechanism is required (if any) to accommodate a particular container size and/or to move the dispensing mechanism to a particular dispensing location. In an embodiment, this determination may be based on attributes of the ordered beverage (e.g., container size) and/or pipelining or traffic engineering considerations of the kiosk 12.

Step 206 may also include determining for some or all of the ingredients to be dispensed by the dispensing mechanism, an angle at which that or those ingredients is/are to be dispensed from the dispensing mechanism, and then what movement (if any) of the dispensing mechanism is required to dispense the ingredient(s) at that or those angles. In an embodiment, this determination may be based on one or more attributes of the ordered beverage (e.g., the particular ingredient being dispense, the container size, etc.).

The parameters determined in step 206 may be determined in one or more ways. One way, though certainly not the only way, is by using the order received in step 202 and a data structure, for example, a look-up table that correlates certain beverages with one or more dispensing parameters to determine the order in which ingredients are dispensed, the timing of the dispensing of the ingredients, and/or the positioning of one or more nozzles from which the ingredients are to be dispensed. Accordingly, in such an embodiment, step 206 may comprise inputting or looking up the ordered beverage in an appropriately configured, pre-populated data structure to determine the parameters of interest to be used in the generation/production of the ordered beverage. The data structure, which may be the same data structure used in step 204 or different therefrom, may be stored in an electronic memory device that is part of or accessible by the ECU 18 of the kiosk 12. Additionally, the parameters may be determined at least partially in response to user inputs or selections as it relates to the ordered beverage. For example, the parameter(s) may be determined based on a user-selected temperature relating to the ordered beverage, ingredient specifications (e.g., shot specifications such as number of shots of espresso and/or additives), frothing specifications (e.g., consistency), and/or other parameters that impact the precise process times of production processes for the ordered beverage.

In any event, in at least some embodiments, one or more of the parameters described above relating to the dispensing of ingredients must be determined prior to method 200 proceeding to the actual dispensing of the ingredients.

Following step 204 (and step 206 in embodiment wherein method 200 includes step 206), method 200 may include a step 208 of generating the ordered beverage in accordance with the types and amounts of the ingredients determined in step 204 and the dispensing parameters determined in step 206, if applicable. In an embodiment, this may comprise the ECU 18 controlling or commanding one or more process modules 20 or other components of the kiosk 12 to perform tasks required to generate the beverage. These tasks may include, for example and without limitation, the generation of ingredients (e.g., brewing coffee product, frothing milk, etc.) and/or the dispensing of ingredients into a container (e.g., cup or mixing chamber) in which at least a portion of the ordered beverage is being (or is to be) generated. In an embodiment, step 208 may further include obtaining a cup in which to serve the ordered beverage which, depending on the particular implementation of the kiosk 12, may be performed as the first step or one of the last steps of the production process, moving the cup to one or more locations at which ingredients are dispensed, and lidding the beverage.

More particularly, in an embodiment, step 208 may comprise one or more substeps. For example, in at least some embodiments wherein the kiosk 12 includes a plurality of process modules 20 or beverage production stations 48 configured to perform the same task/process, step 208 comprises a substep of determining which of those process modules 20 or stations 48 to use for a given task required in the production or generation of the ordered beverage. This determination may be made by the ECU 18 and may be based on various types of information.

This information may include, for example and without limitation, the operational status of one or more process module(s) 20 or station(s) 48 (or a component/module thereof) (e.g., whether it is operational to perform the task or is inoperable). The information may also include the pipelining and traffic engineering of the kiosk 12 and the process modules 20 and/or stations 48 thereof configured to perform the task and/or the optimization of the utilization of the modules or stations (or the components/modules thereof). The information may additionally or alternatively include the relative timing of when other tasks required to generate the ordered beverage are to be performed. In an embodiment, logic or software in the ECU 18 may use a rules engine to determine the most optimal module or station at which to perform the given task given factors/information such as one or more of those mentioned above. For example, the determination may take into account whether a given module or station has a disproportionate loading given the number of beverages being produced or in a queue to be produced. For instance, if many beverages requiring a frothing process are ordered and a frothing unit is disabled or rendered inoperable, then the slack time (i.e., the time a beverage remains at a module or station after a process performed prior to the frothing process is complete) can be minimized by moving the container to a different module or station that is configured to perform the frothing process immediately.

In certain embodiments, step 208 may also include a substep of moving or controlling the movement of a cup/container in which at least a portion of the ordered beverage is being (or is to be) generated to the module 20 or station 48 at which the given task may be performed. In an embodiment, this may comprise the ECU 18 of the kiosk 12 controlling or commanding the movement of the cup handler 115 to obtain the container and/or move the container to the appropriate location. Depending on the particular implementation, the cup handler 115 may drop the container off at the appropriate module or station (i.e., place it in a designated position at or within the module or station (e.g., on or in a container support structure such as a load cell)), or may move the container to a designated position and hold it there until it is determined that the container is to be moved elsewhere (e.g., to another module 20 or station 48, to a holding area within the kiosk 12, to the presenter 118, etc.).

Whether or not step 208 includes one or more of the substeps described above, step 208 comprises the ECU 18 or another suitable component of the system 10 controlling or commanding the process module or one or more components of the station to perform the given task, which may include: dispensing one or more ingredients into the container in which at least a portion of the ordered beverage is being generated; froth ingredient(s) previously dispensed into the container; heat ingredient(s) previously dispensed into the container; etc. In an embodiment, wherein the given task comprises dispensing an ingredient, the ECU 18 or another suitable component may control one or more valves (e.g., a valve 58) located between a source of the ingredient and a dispensing nozzle 54 and that controls the flow of the ingredient from the source to the nozzle 54. Examples of suitable valves can be found in U.S. Patent Publication No. 2013/0087050, the entire contents of which were incorporated by reference above. However, in an illustrative embodiment, solenoid driven pinch valves are used to control the flow of one or more ingredients, and in an embodiment, the valves may be controlled using pulse width modulation (PWM) techniques in order to dispense controlled amounts of ingredients.

One such ingredient than may be dispensed in this manner is a milk product. In an embodiment, respective valves for controlling the flow of two (or more) different milk products having different fat contents can be alternately cycled in pulses to dial in the milk fat content of the overall milk product to a particular value. For example, if 2% milkfat is desired, valves for controlling the flow of skim milk and half-and-half can be alternately cycled in a proportional manner that will result in the ordered beverage containing a correct amount of milk product having a particular/desired fat content. Controlling valves using a PWM technique results in a smooth mixing of ingredients and may provide a desired texture and/or homogeneous viscosity.

In an embodiment wherein one or more dispensing parameters are determined in step 206, step 208 may include one or more substeps in order to dispense ingredients in accordance with that or those parameters.

For example, in an instance wherein a timing parameter is determined in step 206, step 208 may include a substep of monitoring the dispensing of a first ingredient to then determine when to commence the dispensing of a second ingredient. More particularly, in an embodiment where the timing parameter comprises a wait time between the completion of the dispensing of the first ingredient and the commencement of the dispensing of the second ingredient, step 208 may include detecting the completion of the dispensing of the first ingredient using, for example, a sensor of the kiosk 12 (e.g., flowmeter, load sensor, temperature sensor (e.g., infrared temperature sensor), pressure sensor, ultrasonic distance sensor, etc. or other suitable sensor), and then starting a timer of the kiosk 12 (e.g., a time up or time down timer) to determine when to commence the dispensing of the second ingredient.

Similarly, in an embodiment wherein the timing parameter comprises a wait time between the commencement of the dispensing of the first ingredient and the commencement of the dispensing of the second ingredient, step 208 may include a sub step of detecting the commencement of the dispensing of the first ingredient using, for example, a sensor of the kiosk 12 (e.g., flowmeter, load sensor, or other suitable sensor), and then starting a timer of the kiosk 12 (e.g., a time up or time down timer) to determine when to commence the dispensing of the second ingredient.

In an embodiment wherein the timing parameter comprises an amount of the first ingredient that is dispensed before the dispensing of the second ingredient commences, step 208 may include a sub step of measuring and monitoring the amount of the first ingredient that has been dispensed using, for example and as described in greater detail in U.S. Pat. No. 8,515,574 incorporated herein by reference above, a load sensor or another suitable type of sensor (e.g., a flowmeter, temperature sensor (e.g., infrared temperature sensor), pressure sensor, ultrasonic distance sensor, etc.), and determining when to commence the dispensing of the second ingredient based at least in part on feedback from the sensor.

In an embodiment wherein a beverage is generated in accordance with one or more timing parameters, the ECU 18 or another suitable component of the kiosk 12 may be configured to receive feedback from various sensors and to control or command the timing and dispensing of the various ingredients in accordance with the timing parameter(s).

In an instance where the parameter(s) determined in step 206 relating to the positioning of one or more dispensing mechanisms (e.g., nozzles), step 208 may also include a substep of adjusting the positioning of a nozzle 54 from which an ingredient is to be dispensed based on the beverage being produced. As discussed elsewhere above, in an embodiment wherein the kiosk 12 is configured to accommodate different sizes of cups/containers, the nozzle 54 may be reciprocated along an axis amongst various positions corresponding to various cup sizes (e.g., raised and lowered relative to a container support structure of the kiosk). Additionally, or alternatively, the nozzle 54 may be moved angularly (e.g., rotated or pivoted about an axis of rotation) amongst one or more different positions so as to adjust the angle at which ingredients are dispensed therefrom, and or to assume a cleaning position where the nozzle 54 engages or at least is aligned with a drain. The nozzle 54 may also be moved in one or more directions in one or more dimensions to reach a particular dispensing location at which the nozzle 54 is to dispense ingredients. Accordingly, the nozzle 54 may be moved in one or more directions and in one or more dimensions for a number of purposes. The ECU 18 of the kiosk 12 or another suitable component may control one or more electromechanical actuators to adjust and manipulate the position of the nozzle 54.

In an embodiment, the generating step 208 is performed following steps 204 and 206, if applicable. It should be understood, however, that in other embodiments, one or both of steps 204 and 206 may be performed during the generation of the beverage in step 208, and thus, in certain instances there may be overlap in the performance of one or both of steps 204 and 206 and step 208 and the adjusting of the dispensing parameters based on information related to, for example, the status of the kiosk collected from various sensors 119. Accordingly, it is once again noted that the present disclosure is not intended to be limited to the steps of method 200 being performed in any particular order or sequence.

Once the ordered beverage has been generated, method 200 may proceed to a step 210 of presenting the generated beverage to a user/customer. As described elsewhere above, this may comprise, for example, the ECU 18 commanding or controlling the cup handler 115 to move the container/cup in which the beverage is disposed to the presenter 118 where the user may retrieve it.

Clean-in-Place Process

Figure 9:
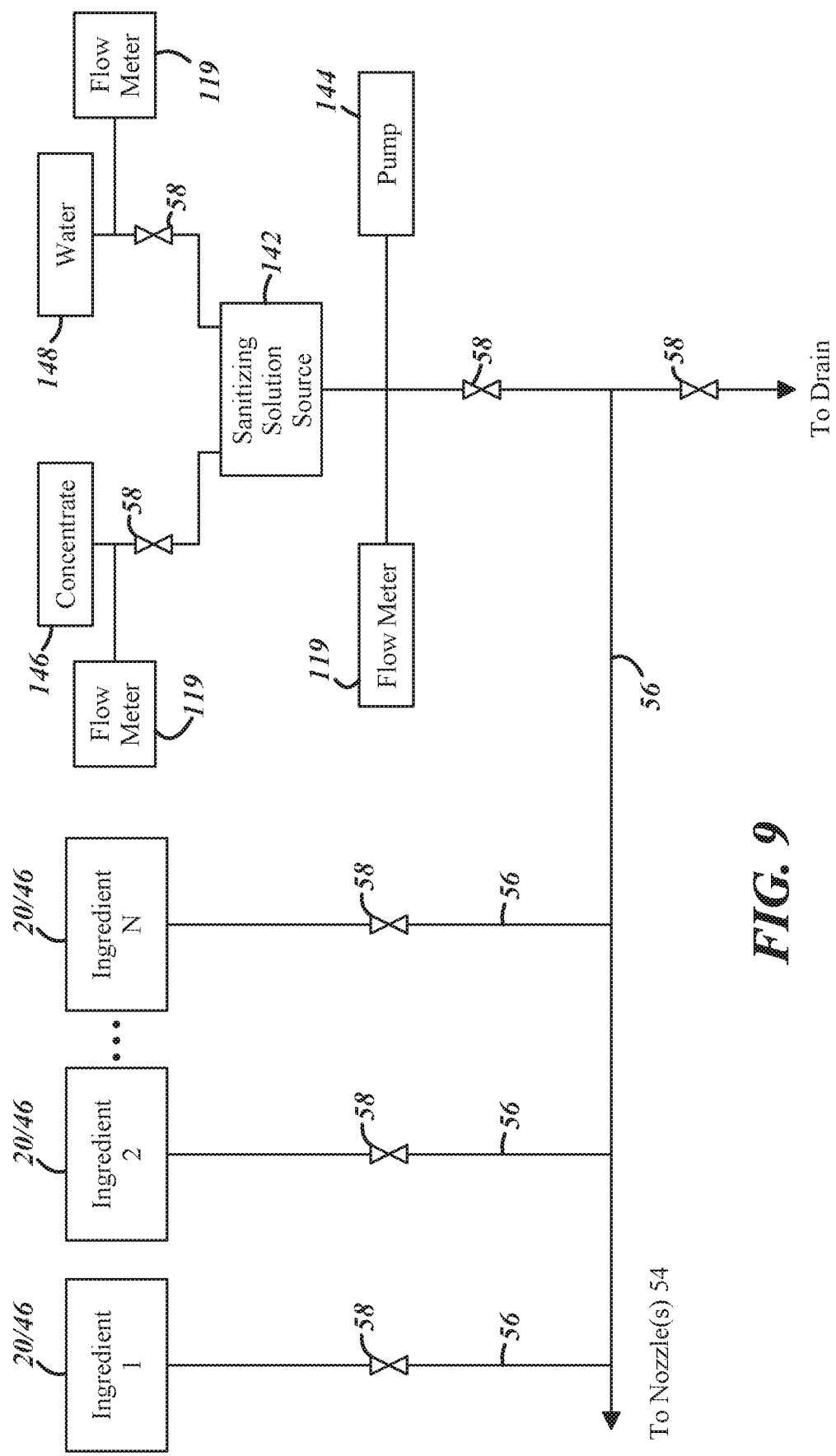
FIG. 9 is a diagrammatic and schematic view of an apparatus for performing a cleaning process on one or more components of a kiosk, for example, the kiosk illustrated in FIG. 2.

In accordance with another aspect of the invention, a process for automatically cleaning and/or sanitizing various components of the kiosk 12 (e.g., all or a subset (i.e., one or more) of the ingredient containers and/or dispensing components) is provided. These components may include, for example, fluid pathways or lines (e.g., tubes 56 shown in FIGS. 4 and 9) through which various types of ingredients (e.g., milk and other additives) flow during the production of a beverage (e.g., between ingredient sources and one or more other components of the kiosk 12 (e.g., process modules, nozzles, etc.), containers in which ingredients are stored, and nozzle(s) from which ingredients are dispensed, to name a few. This cleaning process will be referred to below as a "clean-in-place" or "CIP" process because the components may be cleaned without being moved to a separate cleaning location.

In an embodiment, the CIP process may include multiple aspects or routines. For example, in an embodiment, the CIP process may comprise periodically flushing one or more components with water (e.g., following the production of each beverage). In such an embodiment, one or more valves 58 located between a water supply of the kiosk (i.e., an internal water supply (e.g., receptacle or container of the kiosk 12 for storing water) or external water supply (e.g., a city water supply)) and one or more components of the kiosk 12 used in the generation of the most recently produced beverage (e.g., ingredient supply line(s) 56, nozzle(s) 54, etc.) is/are controlled to cause and allow water to be flushed through one or more components. One or more other valves 58 located between the components being cleaned/flushed and a drain in the kiosk 12 is/are also controlled to provide a path for the water to exit the components and ultimately the kiosk 12 after flushing through the appropriate components. In addition, or alternatively, a pump may be used to push the water through the system components being cleaned/flushed. In an embodiment, the above described cleaning process may be performed on certain components of the kiosk 12 at the same time that other components are being used to produce a beverage.

Another aspect or routine of the CIP process may include a sanitization process that may be periodically performed (e.g., once a day, multiple times a day at particular times, after a predetermined amount of time has elapsed since the last time the sanitization process was performed, in response to information received from sensor(s) of the kiosk, etc.) to clean and sanitize all or a subset (i.e., one or more) of the components of the kiosk 12. In an embodiment such as that illustrated in FIG. 9 wherein the CIP process includes a sanitizing aspect or routine, the kiosk 12 may include a sanitizing solution source 142, a pump 144 for drawing sanitizing solution from the source 142, and one or more valves 58 for controlling the flow of sanitizing solution from the source 142.

More specifically, in an embodiment, the sanitizing solution source 142 comprises a container or receptacle configured to store a sanitizing solution. The solution may comprise a mixture of a sanitizing agent concentrate and water, and the source may be filled with a pre-mixed solution by, for example, maintenance or service personnel. Alternatively, the kiosk 12 may include a sanitizing agent concentrate source 146 and a water source 148 upstream of and fluidly connected to the sanitizing solution source 142. In such an embodiment, valve(s) 58 between the concentrate source 146 and the sanitizing solution source 142 and valve(s) 58 being the water source 148 and the sanitizing solution source 142 may be controlled to allow the sanitizing solution source 142 to be filled with certain predetermined amounts of concentrate and/or water. This allows for the concentration of the sanitizing solution in the source 142 to be set to a particular level and/or adjusted, which, as will be described below, is beneficial in instances where the sanitizing process involves repeated flushing cycles of the components, and it may be desirable to use different concentrations of the sanitizing solution for each flush.

In any event, the kiosk 12 may include the pump 144 and one or more valves 58 between the sanitizing solution source 142 and one or more components of the kiosk 12 that need to be flushed and sanitized (e.g., ingredient dispensing tubes, containers in which ingredients are stored, nozzle(s), etc.). More particularly, when it is time to sanitize one or more components of kiosk 12, one or more valves 58 are opened and the pump 144 draws sanitizing solution from the solution source 142 and pushes/forces it through that or those components. Additional valves 58 downstream of the pump 144 may also be controlled to control the flow path of the sanitizing solution.

For example, assume that the kiosk 12 includes a plurality of ingredient sources 46 each having one or more fluid pathways 56 fluidly coupled thereto. Assume further that one of the ingredient sources 46 is empty and thus it and the fluid pathway(s) 56 corresponding thereto are ready to be sanitized. To sanitize those particular components, certain valves 58 are closed to prevent sanitizing solution from entering fluid pathways and ingredient sources that are not to be sanitized, while certain other valves are opened to allow sanitizing solution to enter the fluid pathway(s) 56 and ingredient sources 46 that are to be sanitized. Further, one or more valves 58 located between the components being cleaned/flushed and a drain in the kiosk 12 may also be opened to provide a path for the sanitizing solution to exit the components and ultimately the kiosk 12. In an at least some embodiments, the above process may be performed at the same time that other components of the kiosk 12 are used in the production of one or more beverages, and thus, the cleaning/sanitizing of some components of the kiosk 12 does not require that the entire kiosk 12 be shut down or idle.

In addition to the components above, in at least some embodiments the kiosk 12 may include one or more additional components that may be useful in performing one or more aspects of the CIP process. For example, the kiosk 12 may include one or more sensors 119 that may be used to measure or determine the amount of one or more fluids being dispensed from one or more sources. More specifically, one or more flowmeters may be used to measure or determine the amount of water or cleaning/sanitizing solution being used to flush one or more components of the kiosk 12. Similarly, one or more flowmeters may be used to detect or determine the amount of water and/or sanitizing concentrate that is dispensed into the sanitizing solution source 142. The sensors 119 of the kiosk 12 may also include sensors (e.g., temperature and/or pressure sensors) configured to detect operational parameters of one or more components of the kiosk to determine, for example, the amount of residue that has built up in the component(s), the amount of ingredients in respective ingredient sources, etc. In an embodiment wherein the kiosk 12 includes such sensors, that or those sensors may be electrically connected to the ECU 18 or another suitable component of the kiosk 12 that is configured to use the information provided by the sensor(s) in the control of the CIP process. Accordingly, embodiments wherein the kiosk 12 includes either components in addition to those described above or less than all of the components described above for carrying out or performing a CIP process remain within the spirit and scope of the present disclosure.

In an embodiment, the ECU 18 of kiosk 12 is configured to control the performance of all aspects of the CIP process. For example, ECU 18 may be configured to determine when to perform one or more aspects of the CIP process and which components are to cleaned/sanitized, and to control one or more components of kiosk 12 (e.g., valves, pumps, etc.) to carry out the one or more processes to be performed. Alternatively, another suitable component in addition to or instead of the ECU 18 may be configured to control the performance of one or more aspects of the CIP process. Further, in an embodiment, the CIP process is a fully automated process that does not require any user involvement with the possible exception of filling one or more fluid sources with, for example, cleaning/sanitizing solution or agents.

FIG. 10 depicts an illustrative embodiment for an automated sanitizing process 300 that may be performed to clean and/or sanitize one or more components of the kiosk 12. For purposes of illustration and clarity, process 300 will be described only in the context of an embodiment of the kiosk 12 described immediately above. It will be appreciated, however, that the application of process 300 is not meant to be limited solely to such an embodiment, but rather process 300 may find application with any number of types or embodiments of kiosks or automated beverage generating systems. It will be further appreciated that while the steps of process 300 will be described as being performed or carried out by one or more particular components of the system 10 or the kiosk 12, in other embodiments, some or all of the steps may be performed by components of the system 10/kiosk 12 other than that or those described. Accordingly, it will be appreciated that the present disclosure is not intended to be limited to an embodiment wherein particular components are configured to perform any particular steps. Additionally, it will be appreciated that unless otherwise noted, the performance of process 300 is not meant to be limited to any one particular order or sequence of steps; rather the steps may be performed in any suitable and appropriate order or sequence and/or at the same time.

In an embodiment, process 300 may include a step 301 of determining or identifying components of the kiosk 12 to clean/sanitize. As described above, these components may include, for example, ingredient sources 46, fluid pathways 56, nozzles 54, and/or other components that may require periodic cleaning/sanitizing, and may include all of the components that can be cleaned/sanitized, or may include a subset (i.e., one or more) of those components. The identification of the components to be cleaned may be carried out in a number of ways.

One way comprises identifying components that have not been cleaned/sanitized within a predetermined period of time. For example, if components of the kiosk 12 are to be cleaned/sanitized every 24 hours, then step 301 comprises identifying components that have not been cleaned in the last 24 hours. In such an embodiment, the kiosk 12 (e.g., ECU 18) may be configured to record when cleaning processes are performed on the components thereof, and to maintain a timer for determining when next to perform the cleaning process.

Another way comprises identifying components that are scheduled to be cleaned at a particular time in accordance with a predetermined cleaning/sanitizing schedule. For example, if certain components are scheduled to be cleaned at a given time, then at that time, step 301 comprises identifying that or those components. In such an embodiment, the kiosk 12 (e.g., ECU 18) may be configured to maintain a cleaning schedule and to control the performance of the cleaning process 300 in accordance with that schedule.

Still another way that components may be identified in step 301 is by evaluating one or more criteria relating to the operation of the kiosk 12 and/or one or more components thereof. For example, step 301 may include identifying all of the components of the kiosk that are idle at the time the cleaning process is being performed. Step 301 may additionally or alternatively comprise identifying components operating outside of predetermined operating tolerances (e.g., components having a residue build up that exceeds a predetermined threshold amount), and then causing that or those components to assume an idle state so that the cleaning process can be performed. And as it relates to ingredient sources 46, step 301 may additionally or alternatively comprise identifying ingredient sources 46 and other components associated therewith that are empty at the time the cleaning process is being performed. The criteria used in step 301 may be monitored by the ECU 18 based on electrical signals received from, for example, sensors 119 associated with the components of the system. The ECU 18 may be configured to receive the signals and to use information represented thereby in evaluating the relevant criteria, and to ultimately identify components to be cleaned based on that evaluation.

It will be appreciated that while certain ways of performing or carrying out step 301 have been described above, any number of suitable ways of performing step 301 may be used in addition to or instead of one more of those described above. Further, it will also be appreciated that step 301 may comprise identifying all of the components of the kiosk 12 that may be cleaned/sanitized, or alternatively may comprise identifying just a subset thereof. In the latter instance, in at least some embodiments, other components of the kiosk 12 not being sanitized may be used to produce one or more beverages at the same time that the components identified in 301 are sanitized so as to allow the kiosk 12 to continued operating even while components are being cleaned/sanitized.

Following step 301, process 300 may move to a step 302 of determining a concentration of sanitizing solution to be flushed through one or more components of kiosk 12. In an embodiment, this may comprise obtaining the information from a data structure stored in a memory device of kiosk 12 or another component of system 10 (e.g., central host 14). Accordingly, the ECU 18 or a processor thereof may access the memory device and obtain the concentration information.

Following the determination in step 302, process 300 may include a step 304 of generating a sanitizing solution having the determined concentration. Step 304 may involve, for example, dispensing into a sanitizing solution source (i.e., container) respective amounts of a sanitizing concentrate and water (or another suitable fluid) that are required to generate a solution having the determined concentration. In an embodiment, the respective amounts can be obtained from a data structure stored in or on a memory device of kiosk 12 or system 10 (e.g., central host 14), and the appropriate amounts can be dispensed with the aid of one or more sensors (e.g., flowmeters) configured to detect or measure the amount of ingredient being dispensed. Alternatively, the dispensing of one or both of the concentrate and water may be metered and thus flowmeters or other sensors to measure the amount of dispensed concentrate or water may not be needed.

A step 306 of process 300 comprises flushing the sanitizing solution contained in the sanitizing solution source 142 (e.g., the solution generated in step 304) through the component(s) identified in step 301 and out through a drain of the kiosk 12. In an embodiment, step 306 may comprise controlling one or more pumps and/or valves of the kiosk 12 to flush the solution through the identified component(s) and out through a drain of kiosk 12. In an instance wherein not all of the components of the kiosk 12 that can be cleaned are actually being cleaned/sanitized during a performance of process 300, step 306 further comprises controlling one or more valves of the kiosk 12 to prevent the solution from entering those components not being cleaned during the performance of process 300.

Following step 306, process 300 may further comprise repeating steps 302-306 one or more times in accordance with a predetermined CIP process protocol. More particularly, and as briefly described above, it may be beneficial to flush one or more components of kiosk 12 more than one time, and in at least certain instances, it may be beneficial and/or desirable to use different concentrations of sanitizing solution for each flush. For example, in an illustrative embodiment, the CIP process may comprise three flush cycles with the concentration of the sanitizing solution being progressively reduced with each successive flush such that the first flush is performed with the highest concentration of a sanitizing agent of the three flushes and the last flush is performed with the lowest concentration of the three flushes (and in some instances, a concentration of zero (i.e., no sanitizing agent)).

Accordingly, in an embodiment, process 300 may include a step 308 of determining whether another flush of the component(s) is required. If it is determined that no additional flushes are needed, the CIP process ends. If, however, it is determined that an additional flush is needed, process 300 returns to step 302 and steps 302-308 are repeated. In an embodiment wherein process 300 does not include either step 302 or 304, but rather begins at step 306 with the flushing of a sanitizing solution having a predetermined and nonadjustable concentration of sanitizing agent, process 300 would return to step 306 and then steps 306 and 308 would be repeated.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. An automated beverage generating system, comprising:
a dispensing mechanism from which an ingredient for producing a specified beverage is dispensed into a container in which the specified beverage is presented to a user;
a container support structure configured to support a container into which an ingredient is to be dispensed from the dispensing mechanism;
one or more electromechanical actuators operatively coupled to the dispensing mechanism and configured to effect rotational movement of the dispensing mechanism within a vertical plan, wherein the one or more electromechanical actuators comprises:
a first electromechanical actuator configured to reciprocate the dispensing mechanism along a first axis towards and away from the container support structure; and
a second electromechanical actuator configured to rotate the dispensing mechanism within the vertical plane about a second axis that is transverse to the first axis; and
a controller electrically connected to the one or more electromechanical actuators and configured to control the operation thereof;
wherein in response to receiving a request to product the specified beverage, the controller is configured to control the operation of at least one of the one or more electromechanical actuators to cause the dispensing mechanism to rotate within the vertical plane.

2. The automated beverage generating system of claim 1, wherein the rotational movement of the dispensing mechanism is dependent on one or more attributes of the specified beverage.

3. The automated beverage generating system of claim 1, wherein the rotational movement of the dispensing mechanism is dependent on one or more attributes of the automated beverage generating system.

4. The automated beverage generating system of claim 1, wherein the dispensing mechanism is configured to be rotated during the dispensing of an ingredient therefrom.

5. The automated beverage generating system of claim 1, wherein the second electromechanical actuator is carried by the first electromechanical actuator such that when the first electromechanical actuator effects movement of the dispensing mechanism, it also effects movement of the second electromechanical actuator.

6. The automated beverage generating system of claim 1, wherein the second electromechanical actuator is configured to rotate the dispensing mechanism to adjust an angle at which an ingredient is dispensed from the dispensing mechanism.

7. The automated beverage generating system of claim 1, wherein the second axis is transverse to a longitudinal axis of the dispensing mechanism.

8. The automated beverage generating system of claim 7, wherein the longitudinal axis of the dispensing mechanism is contained within the vertical plane within which the dispensing mechanism rotates.

9. An automated beverage generating system, comprising:
- a dispensing mechanism from which an ingredient for producing a specified beverage is dispensed into a container in which the specified beverage is presented to a user;
- a plurality of container support structures each configured to support a container into which an ingredient is to be dispensed from the dispensing mechanism;
- one or more electromechanical actuators operatively coupled to the dispensing mechanism, wherein at least one of the one or more electromechanical actuators is configured to rotate the dispensing mechanism within a vertical plane among a plurality of dispensing positions each corresponding to a respective one of the plurality of container support structures; and
- a controller electrically connected to the one or more electromechanical actuators and configured to control the operation thereof,
- wherein in response to receiving a request to produce the specified beverage, the controller is configured to control the operation of the at least one of the one or more electromechanical actuators to cause the dispensing mechanism to rotate within the vertical plane.

10. The automated beverage generating system of claim 9, wherein the one or more actuators is configured to rotate the dispensing mechanism about an axis that is transverse to a longitudinal axis of the dispensing mechanism.

11. The automated beverage generating system of claim 10, wherein the longitudinal axis of the dispensing mechanism is contained within the vertical plane within which the dispensing mechanism rotates.

* * * * *